(12) United States Patent
Tajima

(10) Patent No.: US 9,743,325 B2
(45) Date of Patent: Aug. 22, 2017

(54) COMMUNICATION APPARATUS, STORAGE APPARATUS, AND CONTROL METHOD

(71) Applicant: FUJITSU LIMITED, Kawasaki-shi, Kanagawa (JP)

(72) Inventor: Yoshiharu Tajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 14/860,335

(22) Filed: Sep. 21, 2015

(65) Prior Publication Data
US 2016/0165503 A1 Jun. 9, 2016

(30) Foreign Application Priority Data
Dec. 3, 2014 (JP) ................................ 2014-244554

(51) Int. Cl.
*H04W 36/08* (2009.01)
*H04W 36/00* (2009.01)

(52) U.S. Cl.
CPC ........ *H04W 36/08* (2013.01); *H04W 36/0011* (2013.01)

(58) Field of Classification Search
CPC .......................... H04W 36/08; H04W 36/0011
See application file for complete search history.

(56) References Cited

U.S. PATENT DOCUMENTS

| 2006/0029022 | A1 | 2/2006 | Brouet et al. | |
|---|---|---|---|---|
| 2009/0268655 | A1* | 10/2009 | Bertz | H04W 36/0055 370/312 |
| 2012/0218970 | A1 | 8/2012 | Westberg et al. | |
| 2012/0300747 | A1* | 11/2012 | Westberg | H04W 36/0011 370/331 |
| 2014/0064249 | A1* | 3/2014 | Lee | H04W 36/023 370/331 |
| 2014/0153504 | A1* | 6/2014 | Wang | H04W 28/14 370/329 |
| 2016/0135016 | A1* | 5/2016 | Zou | H04W 4/06 370/312 |

FOREIGN PATENT DOCUMENTS

| JP | 2006-074741 A | 3/2006 |
|---|---|---|
| JP | 2013-505612 A | 2/2013 |

* cited by examiner

*Primary Examiner* — Duc C Ho
(74) *Attorney, Agent, or Firm* — Arent Fox LLP

(57) ABSTRACT

A communication apparatus includes a memory and a processor coupled to the memory and configured to transmit a first content acquisition request to a first server apparatus via a first base station apparatus, receive a content, requested by the first content acquisition request, from the first server apparatus via the first base station apparatus, and change, in a case where coupling is switched from the first base station apparatus to a second base station apparatus in a handover process, a transmission destination address in a second content acquisition request to be transmitted to the second base station apparatus, from a first address of the first server apparatus coupled to the first base station apparatus to a second address of a second server apparatus coupled to the second base station apparatus.

14 Claims, 20 Drawing Sheets

COMMUNICATION APPARATUS, STORAGE APPARATUS, AND CONTROL METHOD

CROSS-REFERENCE TO RELATED APPLICATION

This application is based upon and claims the benefit of priority of the prior Japanese Patent Application No. 2014-244554, filed on Dec. 3, 2014, the entire contents of which are incorporated herein by reference.

FIELD

The embodiments discussed herein are related to a communication apparatus, a storage apparatus, and a control method.

BACKGROUND

Currently, wireless communication systems such as mobile phone systems and wireless local area networks (WLANs) are widely used. In addition, in the field of wireless communication, in order to further improve a communication speed and a communication capacity, a next-generation communication technology has been continuously discussed. For example, in the 3rd Generation Partnership Project (3GPP) serving as a standardization body, standardization of a communication standard called Long Term Evolution (LTE) and a communication standard called LTE-Advanced (LTE-A) and based on LTE has been completed or is under study.

In such wireless communication systems, a content server provides, to terminals, various kinds of contents such as video contents and music contents in some cases. For example, an intensively deployed large-scale data center is used as a content server, and contents are provided by a cloud service.

However, in a case where a distance from a terminal to the large-scale data center is greater than or equal to a predetermined distance, it takes time, greater than or equal to a predetermined time period, for the terminal to become able to use a content after the terminal transmits a content acquisition request, and a transmission delay occurs in some cases. In some cases, owing to the occurrence of such a transmission delay, it is difficult for the terminal to use the content in real time.

Therefore, in wireless communication systems, a technology called edge computing has been proposed. The edge computing is, for example, a technology in which small-scale data centers are dispersedly arranged at locations whose distances from terminals are shorter than distances thereof from a large-scale data center and the small-scale data centers provide contents. Since contents are distributed from the small-scale data centers, transmission delays are resolved, compared with, for example, a case where contents are distributed from the large-scale data center, and it is possible for the terminals to use the contents in real time.

As technologies for wireless communication, for example, there are the following technologies.

In other words, there is a technology in which, in a case where a terminal performs handover, a source base station transmits, to a target base station, a message including a session state parameter for identifying a state of a session and the target base station transmits, based on the relevant parameter, data packets to the terminal.

According to this technology, it is possible to remove a complexity due to, for example, application states being included in caches.

In addition, there is an access controller. If a switching request to switch from a wireless access network whose service area is discontinuous to another access network is detected, the access controller transfers cached data to the other access network after the switching.

According to this technology, it is possible to provide an access network selection method in, for example, a context of an access network whose service area is discontinuous. As documents of the related art, there are Japanese National Publication of International Patent Application No. 2013-505612 and Japanese Laid-open Patent Publication No. 2006-74741.

SUMMARY

According to an aspect of the invention, a communication apparatus includes a memory and a processor coupled to the memory and configured to transmit a first content acquisition request to a first server apparatus via a first base station apparatus, receive a content, requested by the first content acquisition request, from the first server apparatus via the first base station apparatus, and change, in a case where coupling is switched from the first base station apparatus to a second base station apparatus in a handover process, a transmission destination address in a second content acquisition request to be transmitted to the second base station apparatus, from a first address of the first server apparatus coupled to the first base station apparatus to a second address of a second server apparatus coupled to the second base station apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The above-mentioned related arts do not disclose switching of a cache storage medium that caches contents or switching of an access controller in a case where a terminal switches a coupled base station or wireless access point by using handover.

Accordingly, as for the related arts, owing to, for example, switching of a base station or a wireless access point by using handover, a distance from a terminal to a cache storage medium varies between before and after the handover in some cases.

In other words, in the related arts, the distance from the terminal to a cache storage medium after the handover increases compared with the distance from the terminal to a cache storage medium before the handover in some cases. In such as case, time taken for the terminal to become able to use a content after transmitting a content acquisition request increases after the handover, compared with before the handover. Accordingly, in the related arts, in a case where the terminal performs handover, a transmission delay occurs in some cases. If the transmission delay occurs, it is difficult for the terminal to use the content in real time in some cases. Hereinafter, embodiments for implementing the present technology will be described.

First Embodiment

Figure 1:
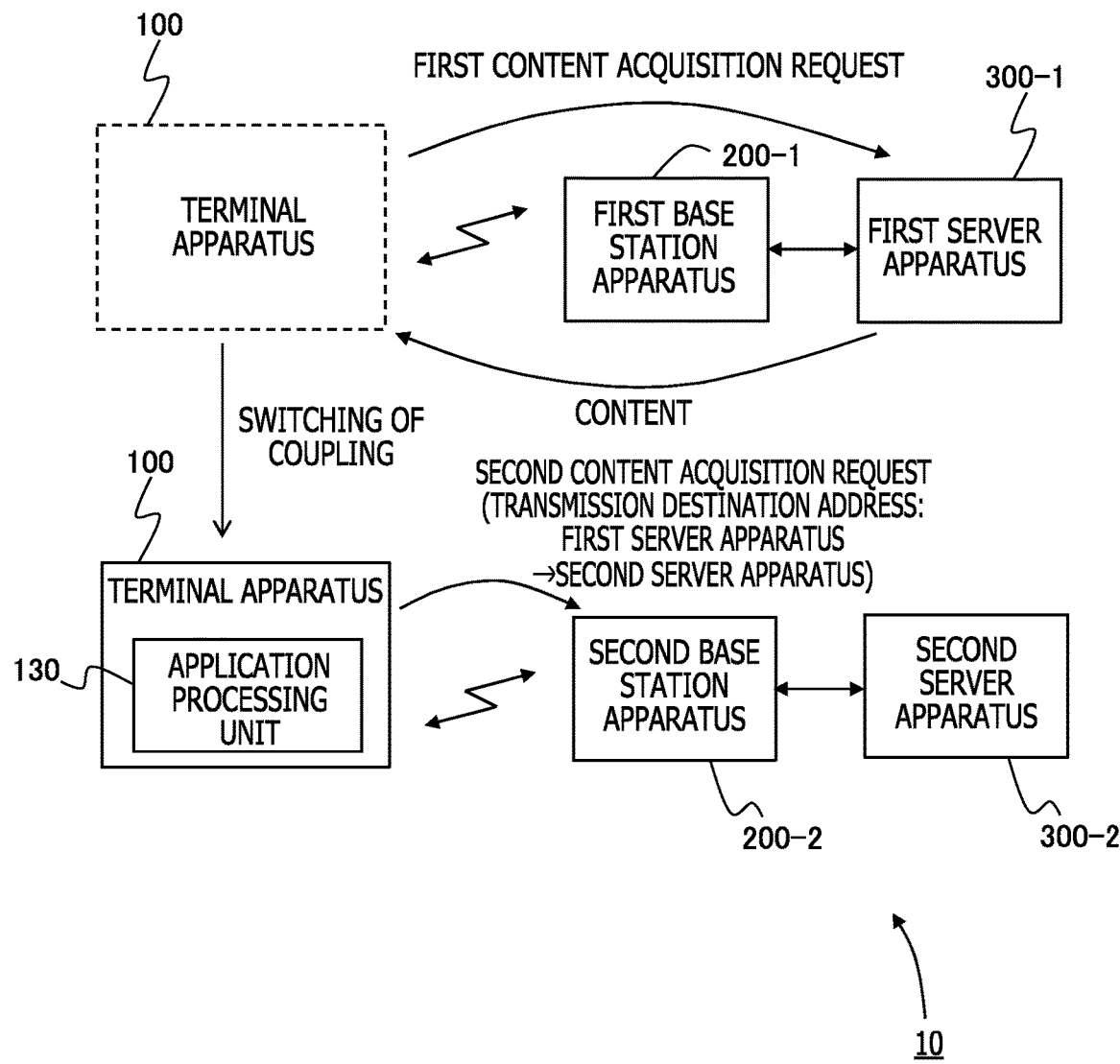
FIG. 1 is a diagram illustrating an example of a configuration of a wireless communication system.

FIG. 1 illustrates an example of a configuration of a wireless communication system 10 in a first embodiment. The wireless communication system 10 includes a terminal apparatus 100, first and second base station apparatuses 200-1 and 200-2, and first and second server apparatuses 300-1 and 300-2.

The terminal apparatus 100 is a wireless communication apparatus such as, for example, a feature phone, a smartphone, or a personal computer. In the wireless communication system 10 illustrated in FIG. 1, an example, in which the terminal apparatus 100 performs handover and switches a coupled base station apparatus from the first base station apparatus 200-1 to the second base station apparatus 200-2, is illustrated.

Each of the first and second base station apparatuses 200-1 and 200-2 is a wireless communication apparatus that performs wireless communication with the terminal apparatus 100 existing within, for example, a service area of the station itself. Each of the first and second base station apparatuses 200-1 and 200-2 is able to provide, to the terminal apparatus 100, various services such as a distribution service for contents and a call service.

Each of the first and second server apparatuses 300-1 and 300-2 receives contents from, for example, a content server and holds the received contents in a memory or the like. In addition, in response to a request from the terminal apparatus 100, the first and second server apparatuses 300-1 and 300-2 each transmit a content to the terminal apparatus 100. A technology in which, in this way, contents are transmitted from the first and second server apparatuses 300-1 and 300-2 dispersedly arranged at locations whose distances from the terminal apparatus 100 are shorter than distances thereof from the content server, is called, for example, the edge computing in some cases. The wireless communication system 10 illustrated in FIG. 1 is an example of a wireless communication system utilizing the edge computing.

The terminal apparatus 100 transmits a first content acquisition request to the first server apparatus 300-1 via the first base station apparatus 200-1 and receives a content, requested by the first content acquisition request, from the first server apparatus 300-1 via the first base station apparatus 200-1.

In addition, the terminal apparatus 100 includes an application processing unit 130. In a case where the terminal apparatus 100 switches coupling from the first base station apparatus 200-1 to the second base station apparatus 200-2, the application processing unit 130 changes an address of a transmission destination of a second content acquisition request to be transmitted to the second base station apparatus 200-2. The application processing unit 130 changes the address of the relevant transmission destination from an address of the first server apparatus 300-1 coupled to the first base station apparatus 200-1 to an address of the second server apparatus 300-2 coupled to the second base station apparatus 200-2.

In this way, in the preset first embodiment, in a case where the terminal apparatus 100 switches a coupled base station apparatus, the terminal apparatus 100 changes the address of the transmission destination of the second content acquisition request from the first server apparatus 300-1 to the second server apparatus 300-2. From this, the second content acquisition request is not transmitted to the first server apparatus 300-1 but is transmitted to, for example, the second server apparatus 300-2, and a content is distributed from the second server apparatus 300-2 to the terminal apparatus 100.

In this case, if a path leading from the first server apparatus 300-1 to the terminal apparatus 100 via the first and second base station apparatuses 200-1 and 200-2 and a path leading from the second server apparatus 300-2 to the terminal apparatus 100 via the second base station apparatus 200-2 are compared with each other, a path length of the latter is short.

Accordingly, in the wireless communication system 10 in the present first embodiment, compared with a case where a content is distributed from the first server apparatus 300-1 via the first and second base station apparatuses 200-1 and 200-2, it is possible to reduce a transmission delay by an amount corresponding to the reduction of the path length.

In addition, since, in the present first embodiment, it is possible to reduce a transmission delay, it is possible for the terminal apparatus 100 to use the content in real time.

Second Embodiment

[Example of Configuration of Wireless Communication System]

Figure 2:
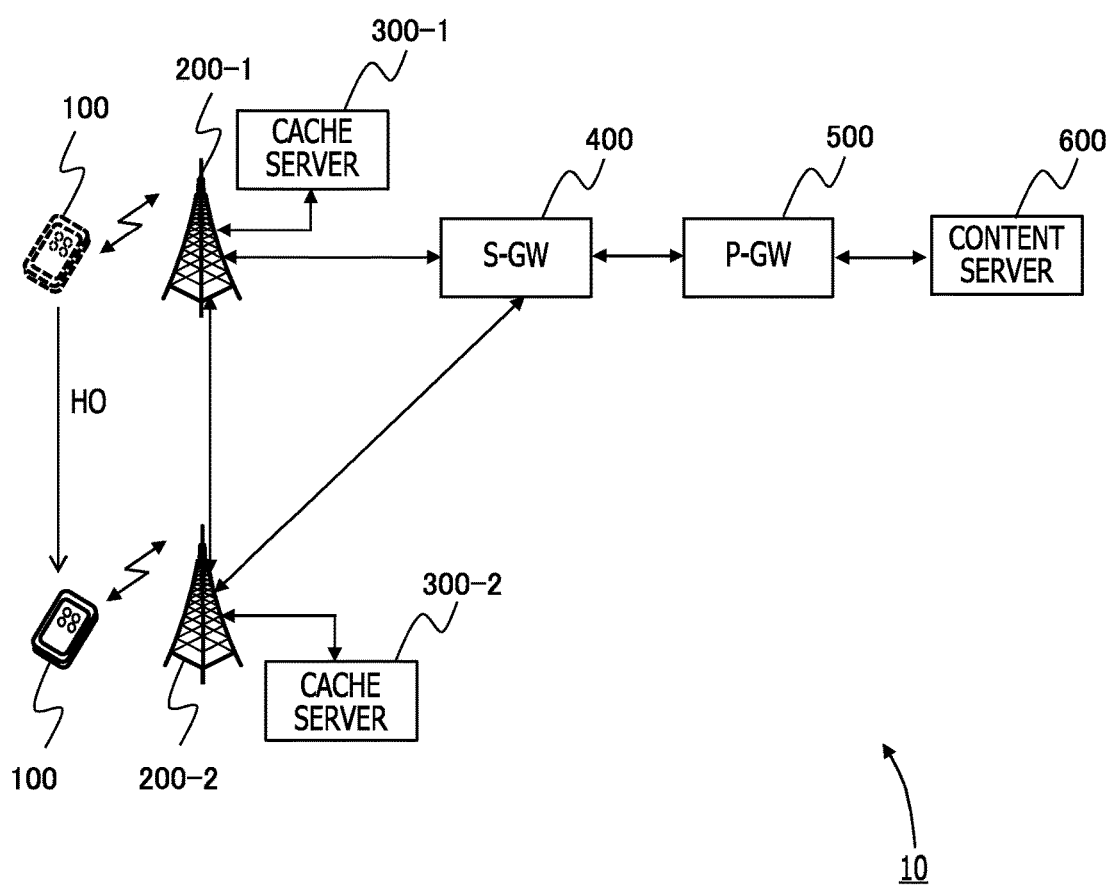
FIG. 2 is a diagram illustrating an example of a configuration of a wireless communication system.

An example of a configuration of a wireless communication system in a second embodiment will be described. FIG. 2 is a diagram illustrating an example of a configuration of a wireless communication system 10.

The wireless communication system 10 includes a terminal apparatus (hereinafter, called a "terminal" in some cases) 100, base station apparatuses (hereinafter, called "base stations" in some cases) 200-1 and 200-2, and cache server apparatuses (hereinafter, called "cache servers" in some cases) 300-1 and 300-2. In addition, the wireless communication system 10 includes a serving gateway (S-GW) 400, a packet data network gateway (P-GW) 500, and a content server apparatus (hereinafter, called a "content server" in some cases) 600.

For example, the first base station apparatus 200-1 and the second base station apparatus 200-2, described in the first embodiment, correspond to the base station 200-1 and the base station 200-2, respectively. In addition, for example, the first server apparatus 300-1 and the second server apparatus 300-2, described in the first embodiment, correspond to the cache server 300-1 and the cache server 300-2, respectively.

In the wireless communication system 10 illustrated in FIG. 2, an example, in which the terminal 100 performs handover (hereinafter, called "HO" in some cases) and switches a coupled base station from the one base station 200-1 to the other base station 200-2, is illustrated.

Here, in some cases, the base station 200-1 to which the terminal 100 is coupled before the HO is called the previous base station 200-1, and the base station 200-2 to which the terminal 100 is coupled after the HO is called the new base station 200-2.

In addition, in some cases, the cache server 300-1 coupled to the previous base station 200-1 is called the previous cache server 300-1 and the cache server 300-2 coupled to the new base station 200-2 is called the new cache server 300-2.

The two cache servers 300-1 and 300-2 each hold contents distributed from the content server 600 and each distribute a content in response to an acquisition request for the content (hereinafter, called a "content acquisition request" in some cases), issued from the terminal 100.

In response to a content acquisition request from, for example, the terminal 100, the previous cache server 300-1 distributes a content to the terminal 100 coupled to the previous base station 200-1 and the new cache server 300-2 distributes a content to the terminal 100 coupled to the new base station 200-2.

In the wireless communication system 10 illustrated in FIG. 2, a content is distributed from each of the cache servers 300-1 and 300-2 whose distances from the terminal 100 are short compared with a case where the content is distributed from the content server 600 to the terminal 100. Therefore, it is possible to resolve a transmission delay.

A technology in which, in this way, contents are not distributed from the intensively deployed content server 600 but are distributed from the dispersedly arranged cache servers 300-1 and 300-2, is called, for example, the edge computing in some cases. The wireless communication system 10 illustrated in FIG. 2 illustrates an example of the edge computing.

The terminal 100 is a wireless communication apparatus such as, for example, a feature phone, a smartphone, or a personal computer. In the service areas of the respective base stations 200-1 and 200-2, the terminal 100 is able to perform wireless communication while being coupled to the individual base stations 200-1 and 200-2 and to receive provided various services such as a call service and a content distribution service.

Each of the base stations 200-1 and 200-2 is a wireless communication apparatus that performs wireless communication with the terminal 100 existing within the service area of the station itself. Each of the base stations 200-1 and 200-2 receives data and so forth relating to contents transmitted from the cache server 300-1 and the content server 600 and converts the received data into a wireless signal, thereby transmitting the wireless signal to the terminal 100. In addition, each of the base stations 200-1 and 200-2 receives a wireless signal transmitted from the terminal 100 and extracts data, a control signal, and so forth from the wireless signal. Each of the base stations 200-1 and 200-2 converts the extracted data and control signal and so forth into a message of a predetermined format and transmits the message to the cache server 300-1 or 300-2 or the S-GW 400.

Each of the cache servers 300-1 and 300-2 holds data (hereinafter, called a "content" in some cases) relating to a content, transmitted from the content server 600. In response to a content acquisition request transmitted from the terminal 100, each of the cache servers 300-1 and 300-2 transmits a held content to the terminal 100. The cache servers 300-1 and 300-2 are coupled to the base stations 200-1 and 200-2, respectively, and perform communication, via the base stations 200-1 and 200-2, respectively, with the terminal 100 and the content server 600.

Here, it may be considered that the previous cache server 300-1 is coupled to the new base station 200-2 via the previous base station 200-1. In addition, it may be considered that the new cache server 300-2 is coupled to the previous base station 200-1 via the new base station 200-2. However, the cache servers 300-1 and 300-2 are coupled to the base stations 200-1 and 200-2, respectively, within predetermined distances. In other words, a distance between the previous cache server 300-1 and the previous base station 200-1 is shorter than a distance from the previous cache server 300-1 to the new base station 200-2 via the previous base station 200-1. In addition, a distance between the new cache server 300-2 and the new base station 200-2 is shorter than a distance from the new cache server 300-2 to the previous base station 200-1 via the new base station 200-2.

The S-GW 400 sets, for example, a path relating to data and relays a content in accordance with the set path. In addition, the S-GW 400 relays messages and so forth exchanged between the cache servers 300-1 and 300-2 and the content server 600.

The P-GW 500 performs issuing of an internet protocol (IP) address, quality of service (QoS) control over data, creation of charging data, and so forth on the terminal 100. Note that, in the present second embodiment, the P-GW 500 functions as a name server apparatus (hereinafter, called a "name server" in some cases). In what follows, the P-GW 500 is described as the name server 500 in some cases. The details of the name server 500 will be described later.

The content server 600 holds contents, and upon receiving a request transmitted from one of the cache servers 300-1 and 300-2, the content server 600 transmits a content according to the relevant request to the corresponding one of the cache servers 300-1 and 300-2.

In what follows, examples of configurations of individual apparatuses 100, . . . included in the wireless communication system 10 will be described.

[Example of Configuration of Terminal Apparatus 100]

Figure 3:
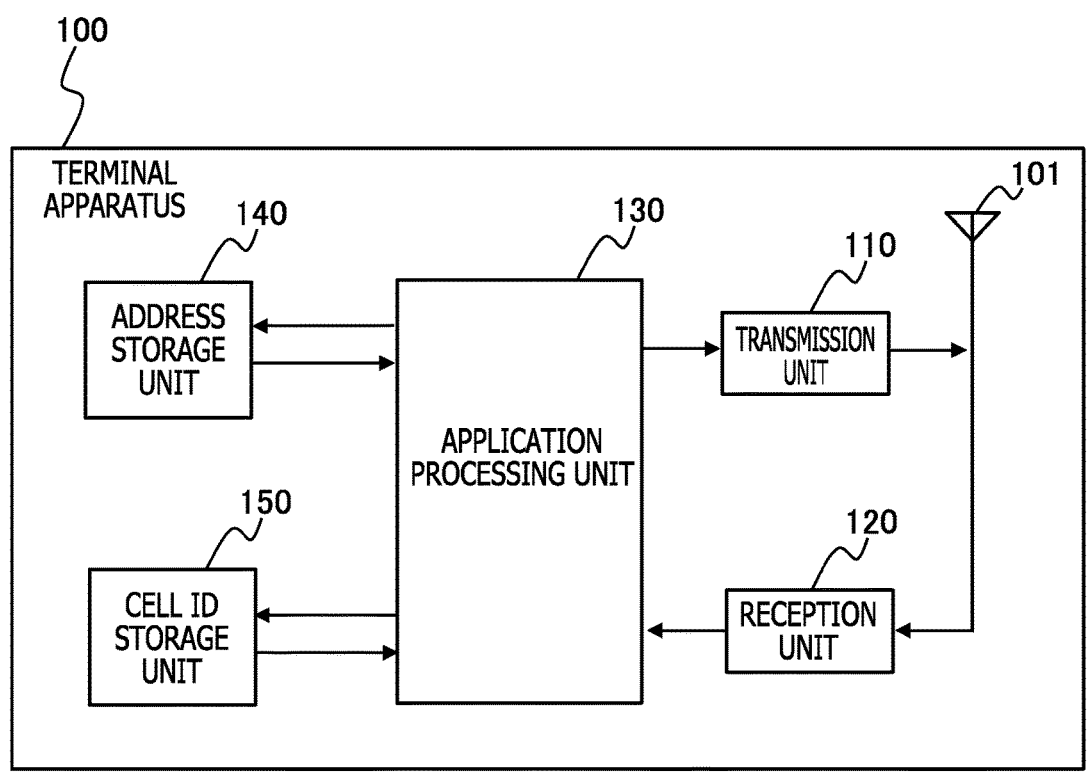
FIG. 3 is a diagram illustrating an example of a configuration of a terminal apparatus.

An example of a configuration of the terminal 100 will be described. FIG. 3 is a diagram illustrating an example of the configuration of the terminal 100. The terminal 100 includes an antenna 101, a transmission unit 110, a reception unit 120, an application processing unit 130, an address storage unit 140, and a cell ID storage unit 150.

The antenna 101 receives a wireless signal from the transmission unit 110 and transmits the received wireless signal to each of the base stations 200-1 and 200-2. In addition, the antenna 101 receives a wireless signal transmitted from each of the base stations 200-1 and 200-2 and outputs the received wireless signal to the reception unit 120.

The transmission unit 110 receives a baseband signal from the application processing unit 130 and converts the baseband signal to a wireless signal in a wireless band. The transmission unit 110 outputs the converted wireless signal to the antenna 101. In the transmission unit 110, a frequency conversion circuit, a band pass filter (BPF), and so forth may be provided so as to perform such conversion processing.

The reception unit 120 converts the wireless signal received from the antenna 101 to a baseband signal in a baseband band and outputs the converted wireless signal to the application processing unit 130. In the reception unit 120, a frequency conversion circuit, a BPF, and so forth may be provided so as to perform such conversion processing and so forth.

The application processing unit 130 performs processing and so forth for, for example, messages or the like exchanged between the terminal 100 itself and the cache servers 300-1 and 300-2.

Specifically, the application processing unit 130 extracts, from the baseband signals received from the reception unit 120, addresses of the cache servers 300-1 and 300-2 and stores the extracted addresses in the address storage unit 140. The address of each of the cache servers 300-1 and 300-2 is, for example, identification information for separating each of the cache servers 300-1 and 300-2 from other cache servers.

In addition, the application processing unit 130 extracts cell identifications (IDs) of the base stations 200-1 and 200-2 from the baseband signals received from the reception unit 120 and stores the extracted cell IDs in the cell ID storage unit 150. The cell ID of each of the base stations 200-1 and 200-2 is identification information for separating each of the base stations 200-1 and 200-2 from other base stations.

Furthermore, the application processing unit 130 generates a content acquisition request. The content acquisition request is used for requesting to acquire a content held in the cache server 300-1 or 300-2.

Addresses of transmission destinations of the content acquisition request are addresses of the cache servers 300-1 and 300-2. The application processing unit 130 reads, from the address storage unit 140, the address of each of the cache servers 300-1 and 300-2 and defines the read address as the address of the transmission destination of the content acquisition request.

In addition, in some cases, the content acquisition request includes the cell ID of the base station 200-1 or 200-2 to which the terminal 100 is coupled. In this case, based on messages or the like exchanged with a coupled base station 200, the application processing unit 130 reads the cell ID of the base station 200-1 or 200-2 to which the terminal 100 is coupled. The application processing unit 130 causes the read cell ID to be included in the content acquisition request.

The address storage unit 140 stores therein the addresses of the cache servers 300-1 and 300-2. A stored address is arbitrarily read by the application processing unit 130. Note that a timing, at which the relevant address is stored, and so forth will be described later.

The cell ID storage unit 150 stores therein the cell IDs of the base stations 200-1 and 200-2. A stored cell ID is arbitrarily read by the application processing unit 130. Note that a timing, at which the cell ID is stored, and so forth will be described later.

[Example of Configuration of Cache Server Apparatus]

An example of configurations of the cache servers 300-1 and 300-2 will be described. The cache servers 300-1 and 300-2 has configurations identical to each other. Therefore, in what follows, unless otherwise noted, the cache servers 300-1 and 300-2 will be described as cache servers 300. In addition, the base stations 200-1 and 200-2 has configurations identical to each other. Therefore, in what follows, unless otherwise noted, the base stations 200-1 and 200-2 will be described as base stations 200.

Figure 4:
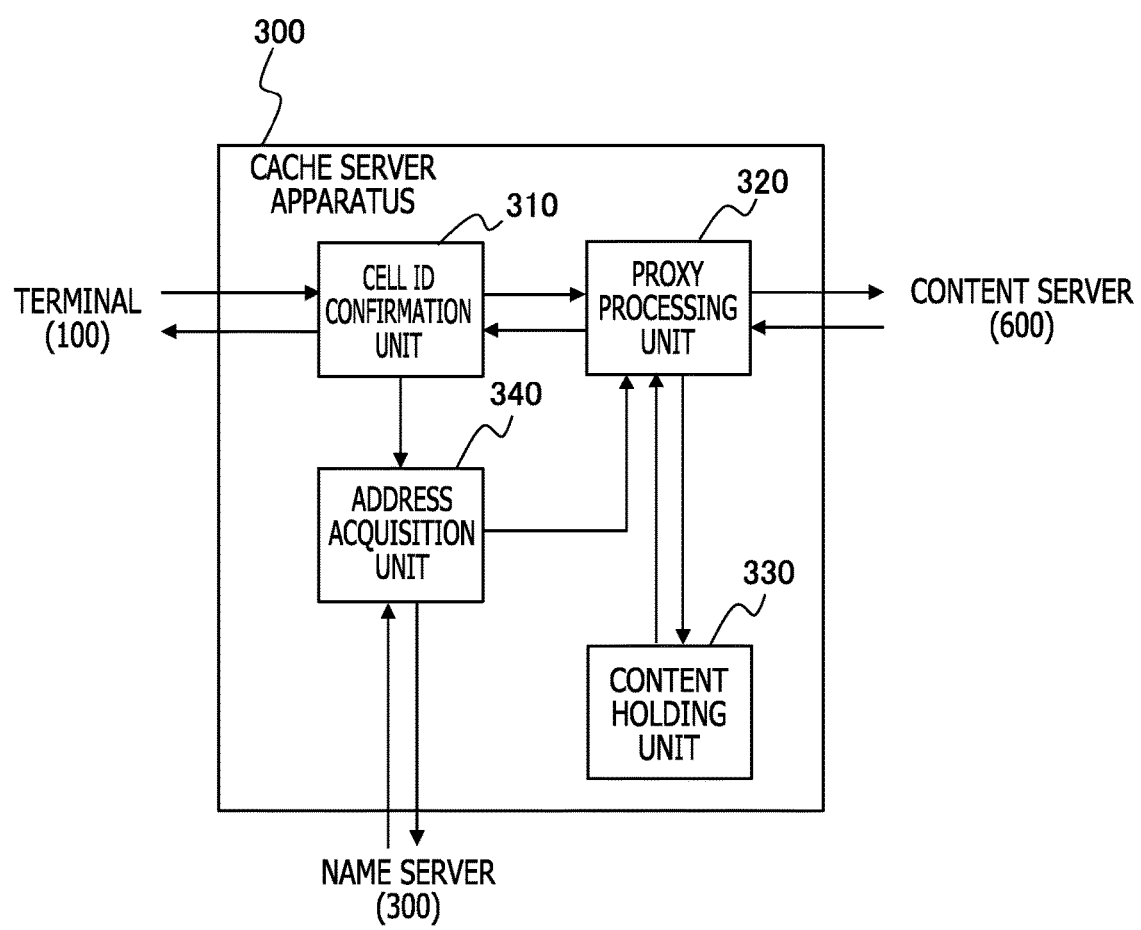
FIG. 4 is a diagram illustrating an example of a configuration of a cache server apparatus.

FIG. 4 is a diagram illustrating an example of a configuration of the cache server 300. The cache server 300 includes a cell ID confirmation unit 310, a proxy processing unit 320, a content holding unit 330, and an address acquisition unit 340.

The cell ID confirmation unit 310 receives a content acquisition request transmitted from the terminal 100 via the base station 200 and extracts a cell ID included in the content acquisition request. In addition, the cell ID confirmation unit 310 judges whether or not the extracted cell ID is different from the cell ID of the base station 200 coupled to the cache server 300 itself. In a case of coincidence, the cell ID confirmation unit 310 outputs the received content acquisition request to the proxy processing unit 320. The case of coincidence is a case where, in, for example, FIG. 2, a cell ID received by the previous cache server 300-1 coincides with the cell ID of the previous base station 200-1 coupled to the previous cache server 300-1.

On the other hand, in a case of non-coincidence, the cell ID confirmation unit 310 determines to change the address of the cache server 300 and notifies the address acquisition unit 340 of an instruction to acquire the address of the cache server 300 corresponding to the cell ID and the relevant cell ID. The case of non-coincidence is a case where, in, for example, FIG. 2, a cell ID received by the previous cache server 300-1 is different from the cell ID of the previous base station 200-1. In this case, the cell ID confirmation unit 310 instructs the address acquisition unit 340 to acquire the address of the cache server 300 corresponding to the received cell ID. The cell ID confirmation unit 310 determines to change, for example, the address of the corresponding cache server 300 and performs processing so as to acquire the address of the corresponding cache server 300. Accordingly, the cell ID confirmation unit 310 functions as an address converter.

Upon receiving the content acquisition request from the cell ID confirmation unit 310, the proxy processing unit 320 notifies the content holding unit 330 to read, from the content holding unit 330, a content requested by the relevant content acquisition request. In a case of receiving a content from the content holding unit 330, the proxy processing unit 320 transmits the received content to the terminal 100 via the cell ID confirmation unit 310.

On the other hand, in a case of receiving, from the content holding unit 330, a notice to the effect that the request content is not held, the proxy processing unit 320 transmits a content acquisition request to the content server 600. In this case, upon receiving, from the content server 600, a content corresponding to the relevant request, the proxy processing unit 320 outputs the relevant content to the content holding unit 330 and transmits, to the terminal 100, the content acquired via the cell ID confirmation unit 310.

In addition, upon receiving, from the address acquisition unit 340, the address of a cache server, the proxy processing unit 320 transmits the received address of the cache server 300 to the terminal 100 via the cell ID confirmation unit 310. In this case, the proxy processing unit 320 may transmit the address of the cache server 300 along with the content.

The content holding unit 330 is, for example, a memory or the like and holds contents. Upon receiving, from the proxy processing unit 320, a notice of reading of a content, the content holding unit 330 reads the content requested by the relevant notice and outputs the read content to the proxy processing unit 320. In this case, in a case of not holding the content requested by the relevant notice, the content holding unit 330 sends, to the proxy processing unit 320, a notice to the effect of not holding the requested content.

Upon receiving, from the cell ID confirmation unit 310, both an instruction to acquire an address and a cell ID, the address acquisition unit 340 requests the name server 500 to acquire the address of the cache server 300 corresponding to the cell ID. This cell ID is, for example, the cell ID of the new base station 200-2. The details thereof will be described later.

In addition, upon acquiring, from the name server 500, the address of the cache server 300 corresponding to the cell ID, the address acquisition unit 340 outputs the acquired address to the proxy processing unit 320.

[Other Examples of Configurations]

Examples of configurations of the name server 500, the base station 200, the content server 600, and so forth will be described.

Figure 5:
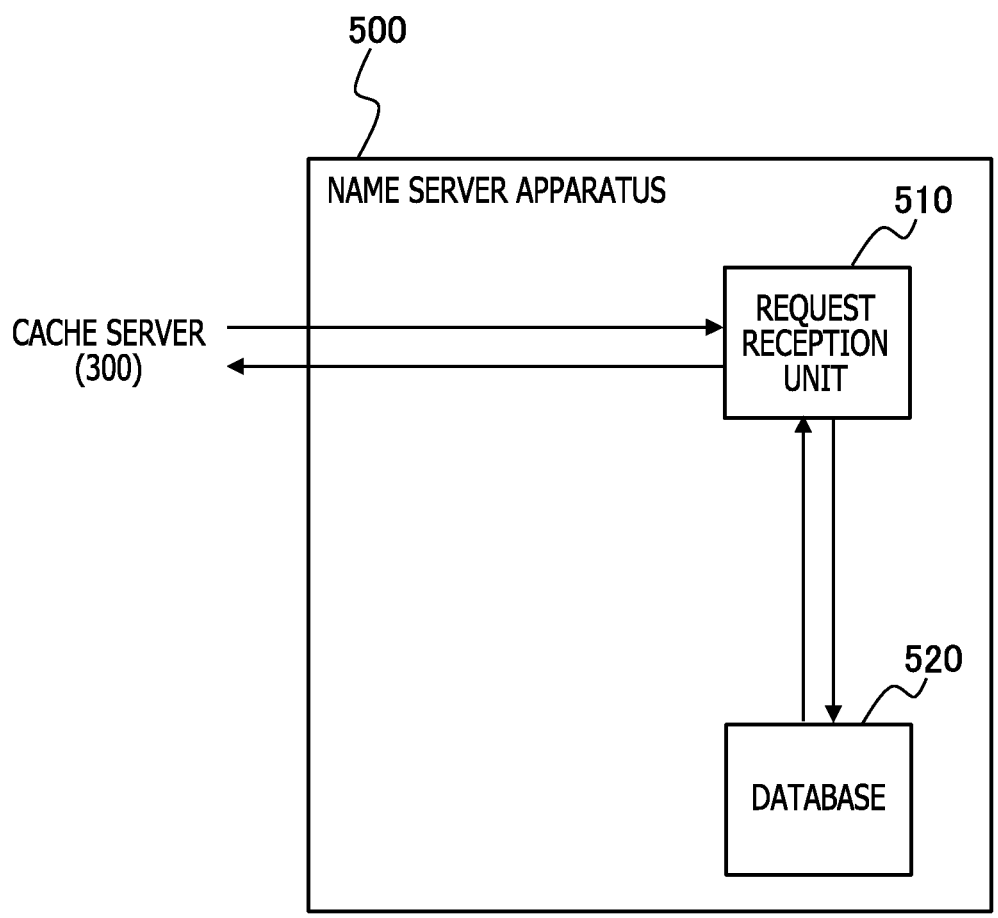
FIG. 5 is a diagram illustrating an example of a configuration of a name server apparatus.

FIG. 5 is a diagram illustrating an example of a configuration of the name server 500. The name server 500 includes a request reception unit 510 and a database 520.

The request reception unit 510 receives a request transmitted from the corresponding cache server 300 and extracts a cell ID included in the relevant request. The request reception unit 510 reads, from the database 520, the address of the cache server 300 corresponding to the extracted cell ID and transmits the read address of the cache server 300 to the corresponding cache server 300.

The database 520 is held within, for example, a memory of the name server 500 and holds a correspondence relationship between cell IDs and the addresses of the cache servers 300.

Figure 6:
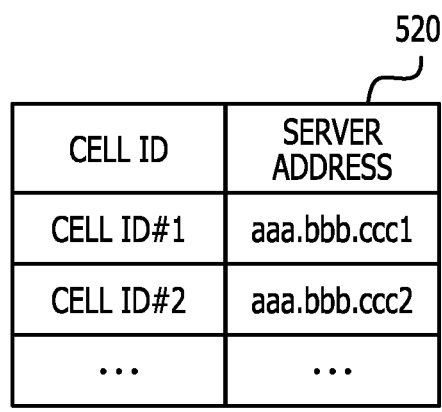
FIG. 6 is a diagram illustrating an example of a configuration of a database.

FIG. 6 is a diagram illustrating an example of the database 520. In the database 520, the address of the cache server 300 corresponding to each of the cell IDs is stored.

For example, regarding the cell ID, "cell ID#1", of the previous base station 200-1, the address of the cache server 300-1 coupled to the previous base station 200-1 is "aaa.bbb.ccc1". In addition, regarding the cell ID, "cell ID#2", of the new base station 200-2, the address of the cache server 300-2 coupled to the new base station 200-2 is "aaa.bbb.ccc2".

Figure 7:
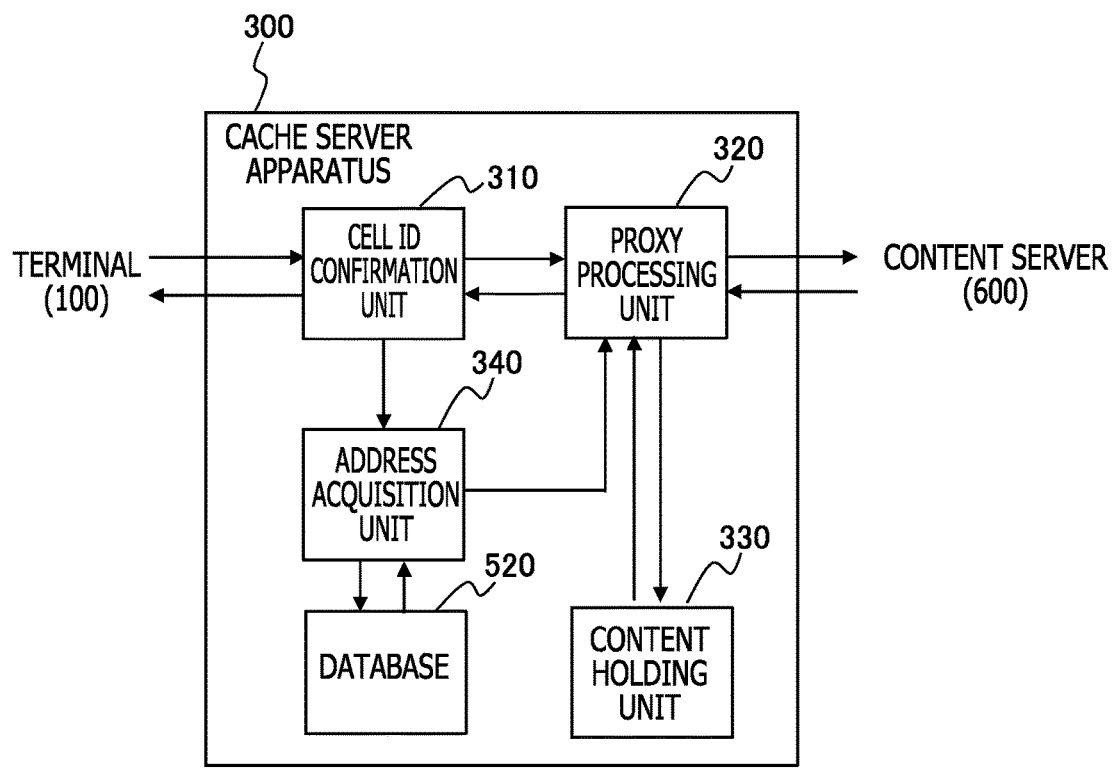
FIG. 7 is a diagram illustrating an example of a configuration of a cache server apparatus.

Returning to FIG. 5, the database 520 is allowed to be held not in the name server 500 but in the cache server 300. FIG. 7 illustrates an example of a configuration of the cache server 300 including the database 520. In this case, the address acquisition unit 340 in the cache server 300 is able to read, from the database 520, the address of the cache server 300 corresponding to the cell ID without transmitting a request to the name server 500.

Figure 8A:
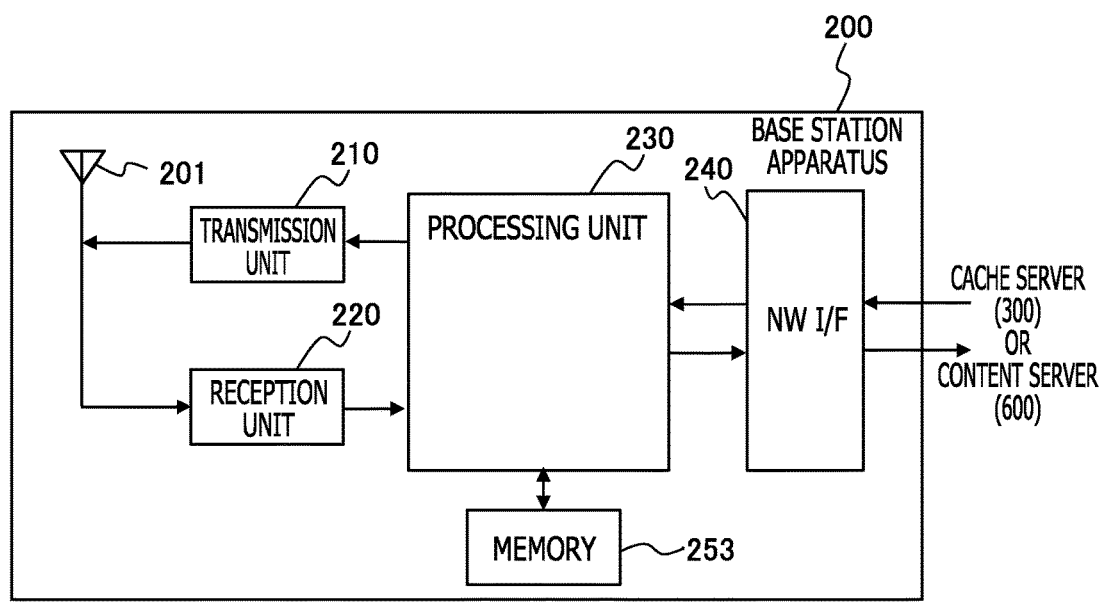
FIG. 8A is a diagram illustrating an example of a configuration of a base station apparatus.

An example of a configuration of the base station 200 will be described. FIG. 8A is a diagram illustrating an example of the configuration of the base station 200. The base station 200 includes an antenna 201, a transmission unit 210, a reception unit 220, a processing unit 230, a network interface (NW I/F) 240, and a memory 253.

The antenna 201 transmits, to the terminal 100, a wireless signal received from the transmission unit 210. In addition, the antenna 201 receives a wireless signal transmitted from the terminal 100 and outputs the received wireless signal to the reception unit 220.

The transmission unit 210 receives a baseband signal from the processing unit 230 and converts the received baseband signal to a wireless signal in a wireless band. The transmission unit 210 outputs the converted wireless signal to the antenna 201.

The reception unit 220 receives the wireless signal from the antenna 201 and converts the received wireless signal to a baseband signal in a baseband band. The reception unit 220 outputs the converted baseband signal to the processing unit 230.

In each of the transmission unit 210 and the reception unit 220, a frequency conversion circuit, a BPF, and so forth may be provided so as to perform such frequency conversion processing.

The processing unit 230 receives, from the NW I/F 240, data and so forth relating to contents and performs error correction coding processing, modulation processing, and so forth on the received data and so forth, thereby generating the baseband signal. The processing unit 230 outputs the generated baseband signal to the transmission unit 210.

In addition, the processing unit 230 performs demodulation processing, error correction decoding processing, and so forth on the baseband signal received from the reception unit 220 and extracts data and so forth. The processing unit 230 outputs the extracted data and so forth to the NW I/F 240.

The NW I/F 240 extracts contents and so forth from messages of predetermined formats and so forth, received from the corresponding cache server 300 and the content server 600, and outputs the extracted contents and so forth to the processing unit 230. In addition, the NW I/F 240 converts, into messages of predetermined formats and so forth, data and so forth received from the processing unit 230 and transmits the converted messages and so forth to the cache server 300 and the content server 600.

When processing is performed in, for example, the processing unit 230, data and so forth are arbitrarily stored in the memory 253.

Figure 8B:
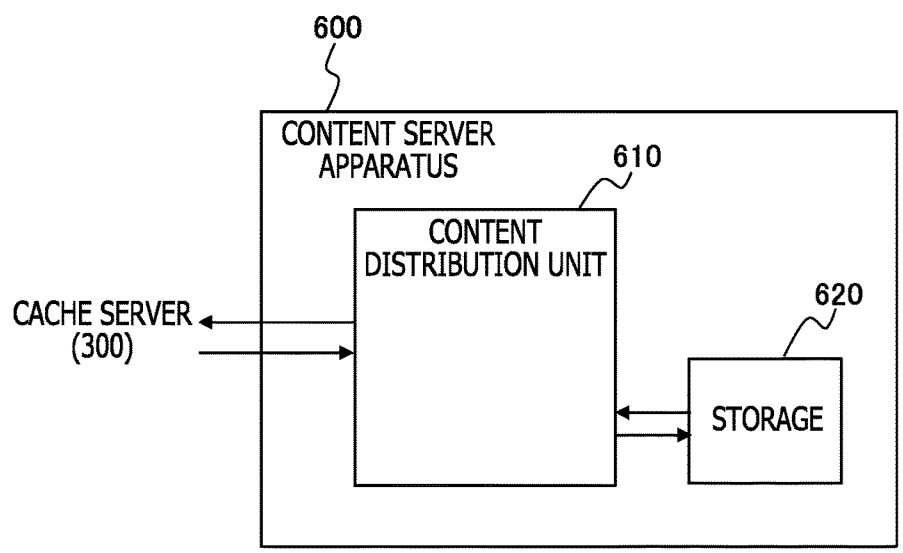
FIG. 8B is a diagram illustrating an example of a configuration of a content server apparatus.

An example of a configuration of the content server 600 will be described. FIG. 8B is a diagram illustrating an example of the configuration of the content server 600. The content server 600 includes a content distribution unit 610 and a storage unit 620.

Upon receiving a content acquisition request transmitted from the corresponding cache server 300, the content distribution unit 610 reads a requested content from the storage 620 and transmits the relevant content to the relevant cache server 300.

The storage 620 is a large-capacity storage medium such as, for example, a hard disk drive (HDD) or a cassette tape and stores therein data relating to various contents.

[Example of Operation]

An example of an operation will be described. An example of an operation in a case where, as illustrated in, for example, FIG. 2, the terminal 100 is coupled to the previous base station 200-1 and switches coupling to the new base station 200-2 by using HO will be described.

Figure 9:
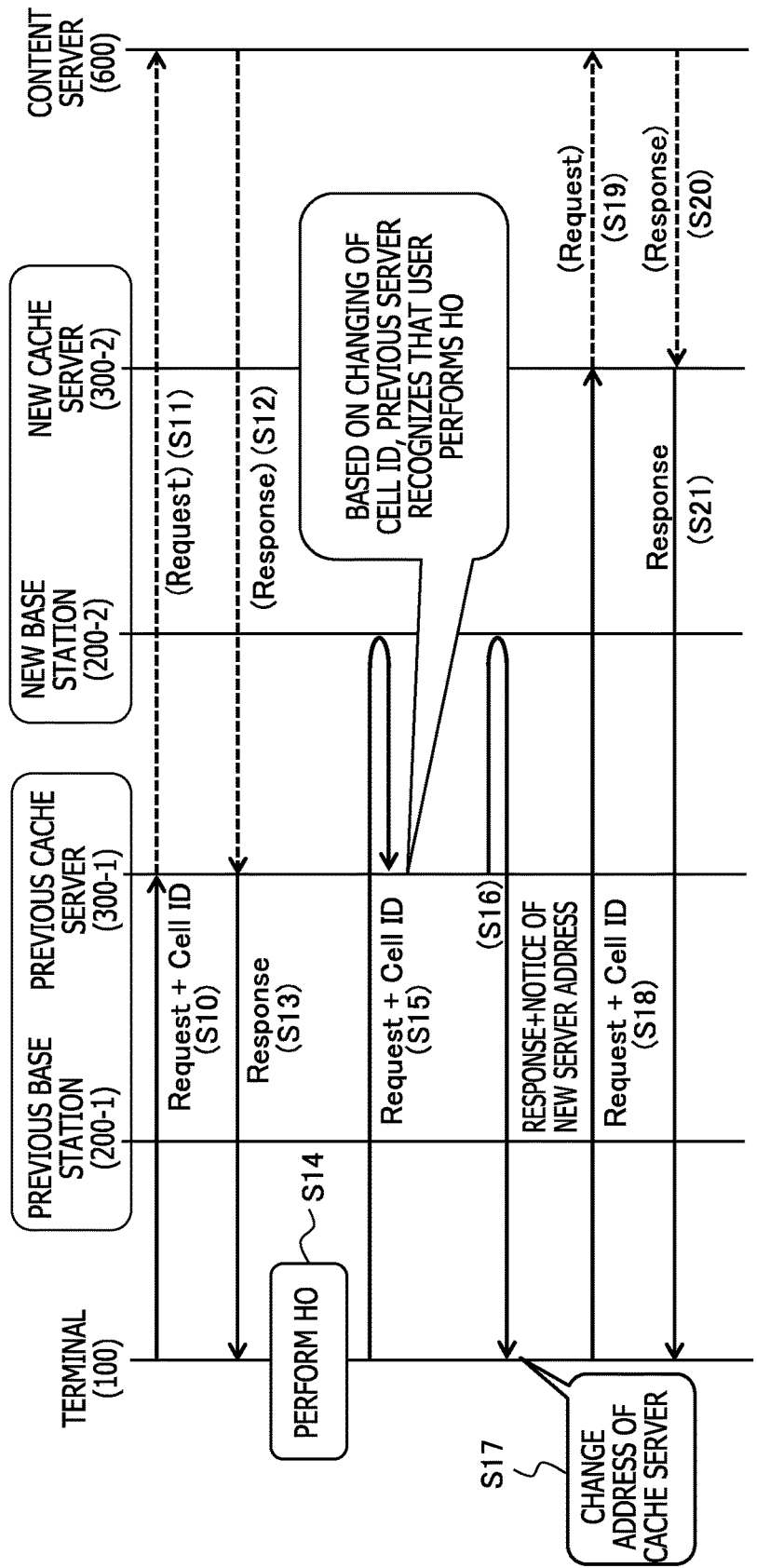
FIG. 9 is a sequence diagram illustrating an example of an operation.

FIG. 9 is a sequence diagram illustrating an example of an operation in the wireless communication system 10.

In a case of being coupled to the previous base station 200-1, the terminal 100 generates a content acquisition request and transmits the generated content acquisition request to the previous cache server 300-1 (S10). At this time, the terminal 100 transmits the content acquisition request including the cell ID of the coupled previous base station 200-1.

While, at the time of, for example, processing for being coupled to the previous base station 200-1 (or a network side including the previous base station 200-1), the terminal 100 is assigned with an IP address by the P-GW 500, the terminal 100 is notified of the address of the previous cache server 300-1 by the P-GW 500 at that time. The address of the previous cache server 300-1, given notice of, is arbitrarily stored in the address storage unit 140 by the application processing unit 130.

In addition, the terminal 100 acquires the cell ID of the previous base station 200-1 at the time of, for example, processing for being coupled to the previous base station 200-1, or the terminal 100 acquires the cell ID of the previous base station 200-1, based on annunciation information broadcast transmitted at the time of being coupled to another base station. The acquired cell ID of the previous base station 200-1 is stored in the cell ID storage unit 150 by the application processing unit 130.

Using the address of the previous cache server 300-1 and the cell ID of the previous base station 200-1, acquired in this way, the terminal 100 is able to generate a content acquisition request that is addressed to the relevant address and that includes the relevant cell ID.

In this case, the application processing unit 130 generates, for example, identification information of a content corresponding to a user operation and generates a content acquisition request including the identification information of the content.

Upon receiving the content acquisition request, the previous cache server 300-1 transmits the requested content to the terminal 100 (S13).

Figure 10:
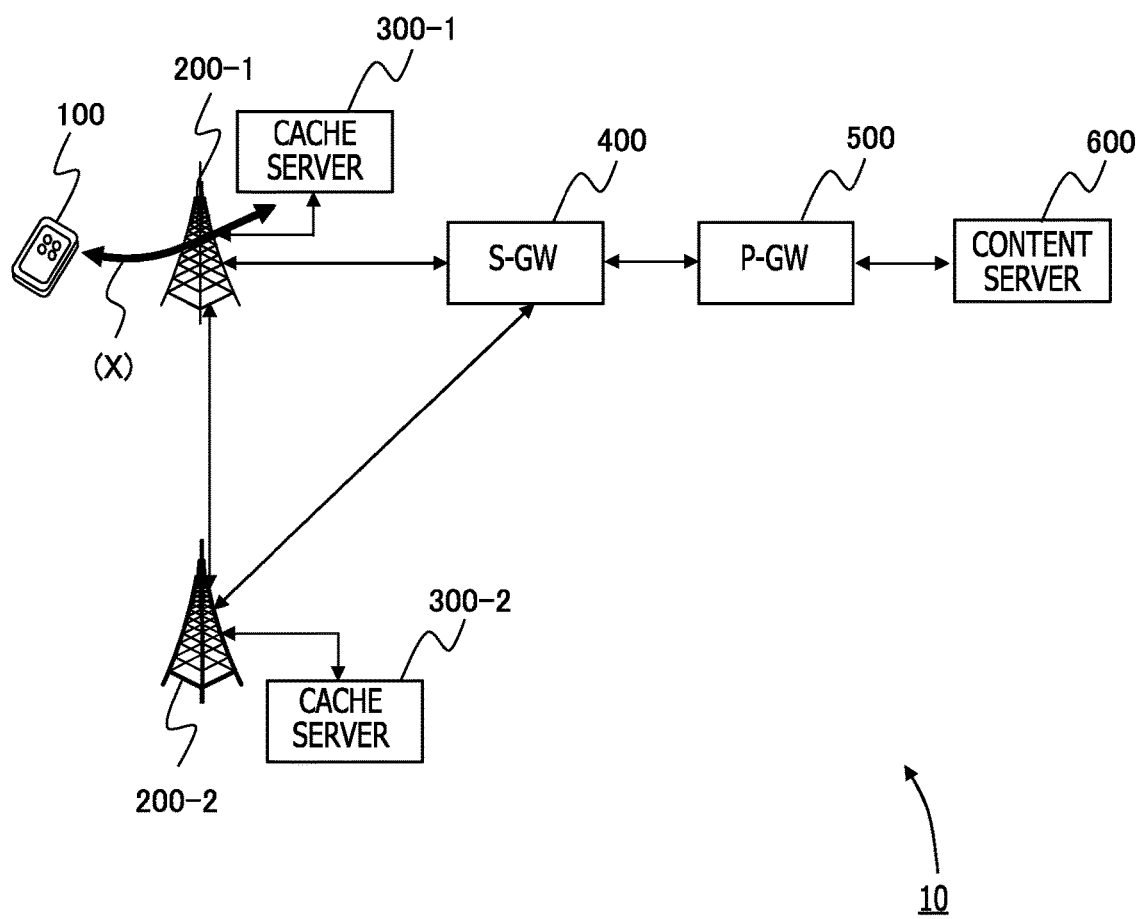
FIG. 10 is a diagram illustrating an example of a transmission path of a content.

FIG. 10 is a diagram illustrating an example of a path of a content in the wireless communication system 10. In processing operations in S10 to S13, the content acquisition request and the content are exchanged via a path (X). The path (X) is a path that leads from the terminal 100 before HO to the previous cache server 300-1 via the previous base station 200-1.

Returning to FIG. 9, note that in a case of not holding the requested content, the previous cache server 300-1 transmits a content acquisition request to the content server 600 (S11). In addition, the previous cache server 300-1 receives the content from the content server 600 (S12) and transmits the received content to the terminal 100 while holding the received content (S13).

The terminal 100 performs HO (S14). Based on the HO, the terminal 100 switches a coupled base station from the previous base station 200-1 to the new base station 200-2.

The terminal 100 transmits a content acquisition request to the previous cache server 300-1 (S15). At this time, the terminal 100 causes the cell ID (for example, the cell ID#2) of the new base station 200-2 to be included in the content acquisition request.

For example, the following processing is performed. In other words, by exchanging a message or the like with the corresponding base station 200 at the time of HO processing or processing for being coupled to the corresponding base station 200, the terminal 100 is able to acquire the cell ID of the coupled base station 200. Based on the HO processing, the terminal 100 is able to acquire the cell ID of the coupled new base station 200-2. From this, the terminal 100 is able to generate and transmit the content acquisition request including the acquired cell ID.

Upon receiving the content acquisition request from the terminal 100, the previous cache server 300-1 transmits a requested content to the terminal 100 (S16). At this time, the previous cache server 300-1 transmits, to the terminal 100, the address (a "new server address" in FIG. 9) of the new cache server 300-2 coupled to the new base station 200-2.

With respect to the cell ID (for example, S10) received before the HO, the previous cache server 300-1 receives a cell ID different from the relevant cell ID after the HO (for example, S15). In this case, the previous cache server 300-1 receives the cell ID of the other base station 200-2, which is not the cell ID of the previous base station 200-1 to which the station itself is coupled. By receiving the cell ID different from the cell ID of the previous base station 200-1 to which the station itself is coupled, the previous cache server 300-1 is able to recognize that the terminal 100 performed the HO.

In the present second embodiment, in this case, the previous cache server 300-1 performs processing so as to acquire the address of the new cache server 300-2 coupled to the new base station 200-2 to which the terminal 100 is coupled after the HO. The previous cache server 300-1 sends an inquiry to, for example, the name server 500 and acquires the address of the new cache server 300-2, or the previous cache server 300-1 acquires the address of the new cache server 300-2 from the database 520 held in the station itself.

In addition, the previous cache server 300-1 transmits the acquired address of the new cache server 300-2 to the terminal 100 (S16). From this, the terminal 100 is able to acquire, for example, the address of the new cache server 300-2, and afterward, the terminal 100 becomes able to transmit a content acquisition request to the new cache server 300-2.

Note that in a case of not holding the content requested by the terminal 100, the previous cache server 300-1 transmits a content acquisition request to the content server 600. In addition, the previous cache server 300-1 transmits, to the terminal 100, the content received from the content server 600 while holding the received content.

Upon acquiring the content and the address of the new cache server 300-2, the terminal 100 changes the address of the corresponding cache server 300 from the previous cache server 300-1 to the new cache server 300-2 (S17). The application processing unit 130 stores the address of the new cache server 300-2 in, for example, the address storage unit 140, thereby performing the preset processing. The application processing unit 130 changes the address of the transmission destination of the content acquisition request from the address of the previous cache server 300-1 to the address of the new cache server 300-2. Afterward, the application processing unit 130 becomes able to transmit a content acquisition request in which the address of the transmission destination is changed to the address of the new cache server 300-2. Since changing, for example, the address of the corresponding cache server 300, the application processing unit 130 functions as an address converter.

The terminal 100 transmits the content acquisition request to the new cache server 300-2 (S18).

Upon receiving the content acquisition request, the new cache server 300-2 transmits a requested content to the terminal 100 (S21). In this case, in a case of not holding the requested content, the new cache server 300-2 transmits a content acquisition request to the content server 600 and transmits the content received from the content server 600 to the terminal 100 while holding the received content (S19 and S20).

Note that, in FIG. 9, the terminal 100 transmits a content acquisition request three times in S10, S15, and S18. The terminal 100 may transmit a content acquisition request for an identical content three times or may transmit content acquisition requests for respective contents different from one another.

Figure 11:
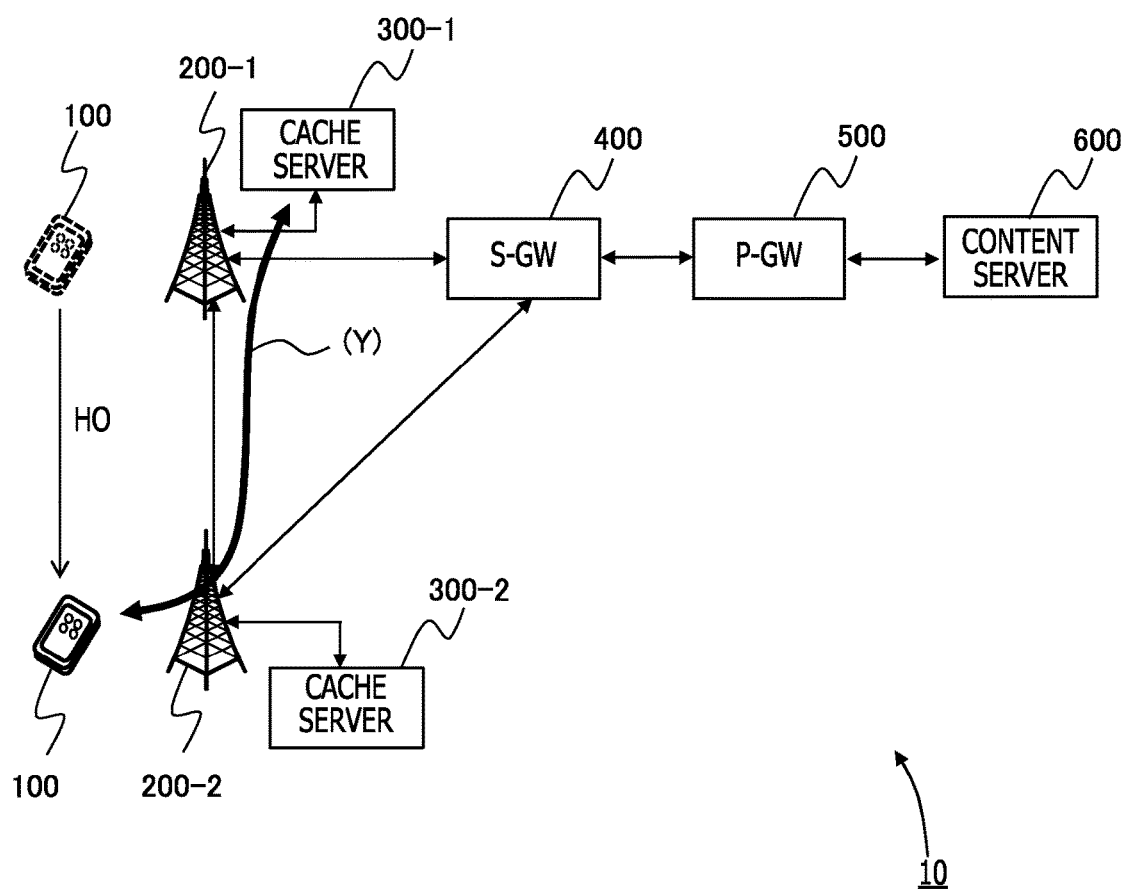
FIG. 11 is a diagram illustrating an example of a transmission path of a content.

FIG. 11 illustrates an example of a path of a content in a case where the corresponding cache server 300 is not changed after the HO. A path in this case is a path (Y). The path (Y) is a path that leads from the terminal 100 after the HO to the cache server 300-1 via the new base station 200-2 and the previous base station 200-1.

Figure 12:
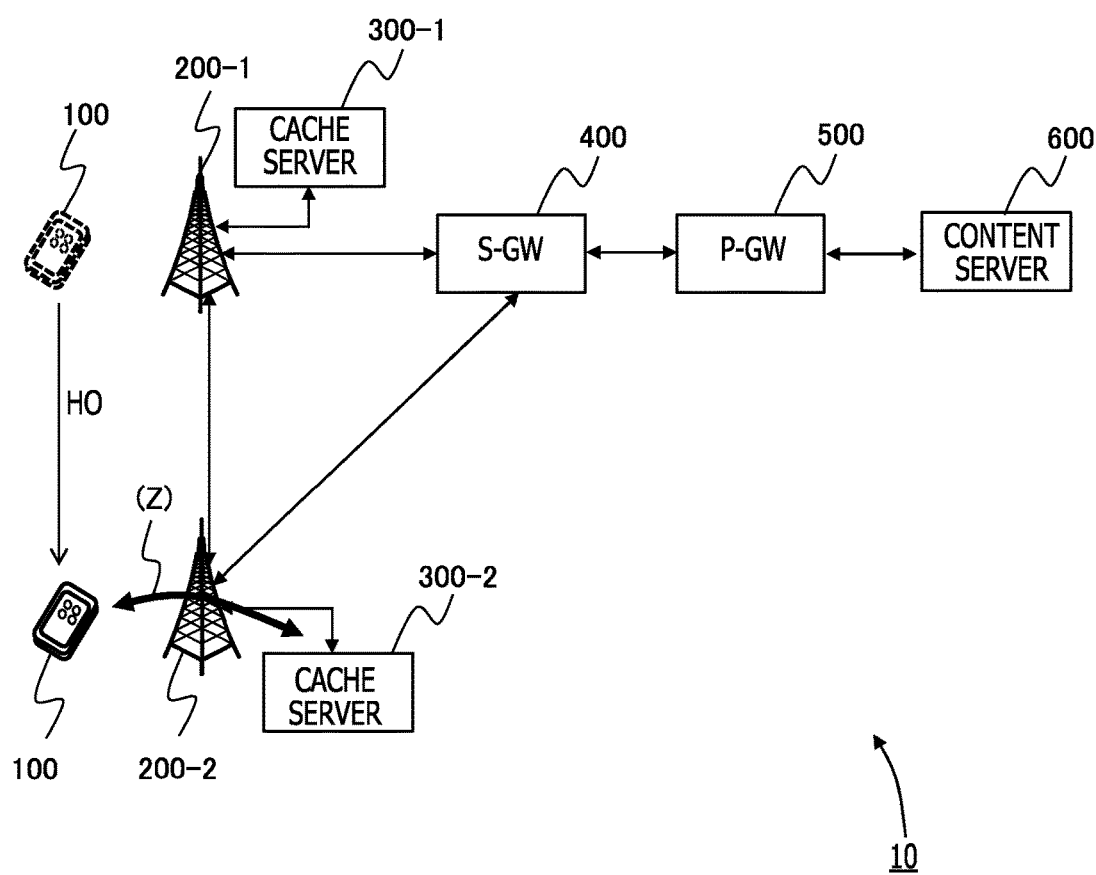
FIG. 12 is a diagram illustrating an example of a transmission path of a content.

On the other hand, FIG. 12 illustrates an example of a path of a content after the HO in the present embodiment. The transmission destination address of a content acquisition request is changed, for example, from the previous cache server 300-1 to the new cache server 300-2, and the content acquisition request is transmitted to the new cache server 300-2 accordingly. From this, the terminal 100 is able to acquire the content by using a path (Z). In other words, the terminal 100 after the HO is able to exchange the content acquisition request and the content with the new cache server 300-2 via the new base station 200-2.

In the present second embodiment, the address of the transmission destination of the content acquisition request is changed from the address of the previous cache server 300-1 to the address of the new cache server 300-2. Accordingly, the terminal 100 is able to transmit the content acquisition request to the new cache server 300-2 (S18) and to acquire the content from the new cache server 300-2 (S21). From this, it is possible to acquire the content via, for example, the path (Z) illustrated in FIG. 12.

In the present second embodiment, by coupling the cache servers 300-1 and 300-2 within ranges of predetermined distances from the base stations 200-1 and 200-1, respectively, a content is transmitted at a distance shorter than a distance from the terminal 100 to the content server 600. Since, from this, time from when transmitting a content acquisition request till when acquiring a content decreases compared with that in a case of acquiring it from the content server 600, the terminal 100 is able to reduce a transmission delay.

However, in a case where the terminal 100 performs HO and switching between the cache servers 300-1 and 300-2 is not performed, a path length after the HO (for example, FIG. 11) increases compared with a path length before the HO (for example, FIG. 10) in some cases. In such a case, a distance from the terminal 100 to the cache server 300 after the HO increases compared with that before the HO. Therefore, time from a content acquisition request till when acquiring a content increases. Accordingly, owing to the HO of the terminal 100, a transmission delay occurs in the terminal 100 in some cases.

Therefore, in the present second embodiment, by switching, based on the HO, the corresponding cache server 300 to the new cache server 300-2 (for example, FIG. 12), it is possible to reduce a path length based on a path for acquiring a content, compared with a case of not switching (for example, FIG. 11).

Accordingly, in the present second embodiment, it is possible to reduce a transmission delay, compared with a case where switching of the corresponding cache server 300 is not performed. In addition, in the present second embodiment, the reduction of the transmission delay enables the terminal 100 to use a content in real time.

Figure 13:
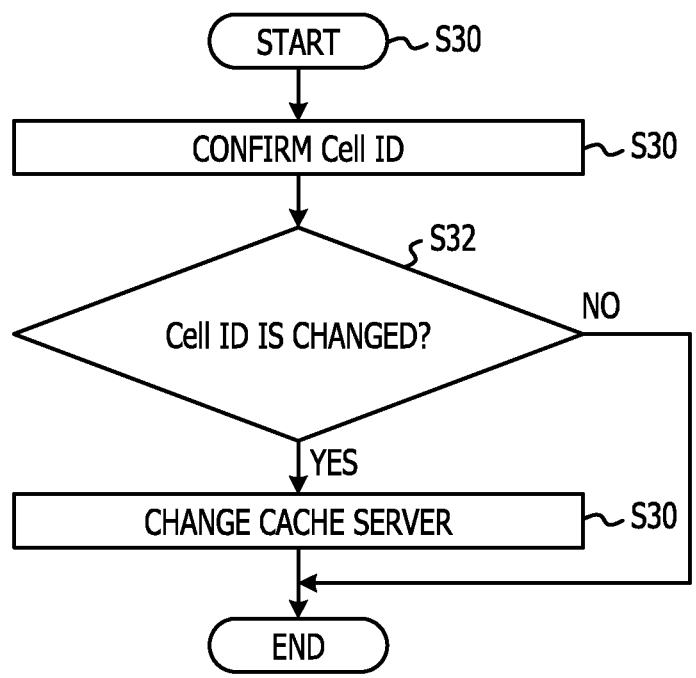
FIG. 13 is a flowchart illustrating an example of an operation.

FIG. 13 is a flowchart illustrating an example of processing in the previous cache server 300-1. Some of individual processing operations illustrated in FIG. 13 overlap with processing operations in the sequence diagram illustrated in FIG. 9.

If starting the processing (S30), the previous cache server 300-1 confirms a cell ID included in a content acquisition request received from the terminal 100 (S31).

The previous cache server 300-1 judges whether or not the confirmed cell ID is changed (S32). Based on, for example, whether or not the cell ID included in the content acquisition request is different from the cell ID of the base station 200-1 coupled to the station itself (the previous cache server 300-1), the cell ID confirmation unit 310 performs the judgment.

If judging that the cell ID is changed (S32: YES), the previous cache server 300-1 transmits the address of the new cache server 300-2 after the change to the terminal 100 (S33).

In addition, the previous cache server 300-1 terminates a series of processing operations (S34).

On the other hand, in a case of judging that the confirmed cell ID is not changed (S32: NO), the previous cache server 300-1 terminates a series of processing operations without changing the address of the corresponding cache server 300 (S34).

In a case where, for example, the cell ID included in the content acquisition request and the cell ID of the base station 200-1 coupled to the previous cache server 300-1 coincide with each other, the cell ID confirmation unit 310 judges that the confirmed cell ID is not changed. In this case, the corresponding cache server 300 outputs the content acquisition request to the proxy processing unit 320 and transmits a cached content and so forth to the terminal 100.

Third Embodiment

A third embodiment will be described. In the second embodiment, an example in which, for example, the previous cache server 300-1 plays a leading role in changing the address of the corresponding cache server 300 is described. The present third embodiment is an example of a case where, for example, the terminal 100 plays a leading role in changing the address of the corresponding cache server 300.

Figure 14:
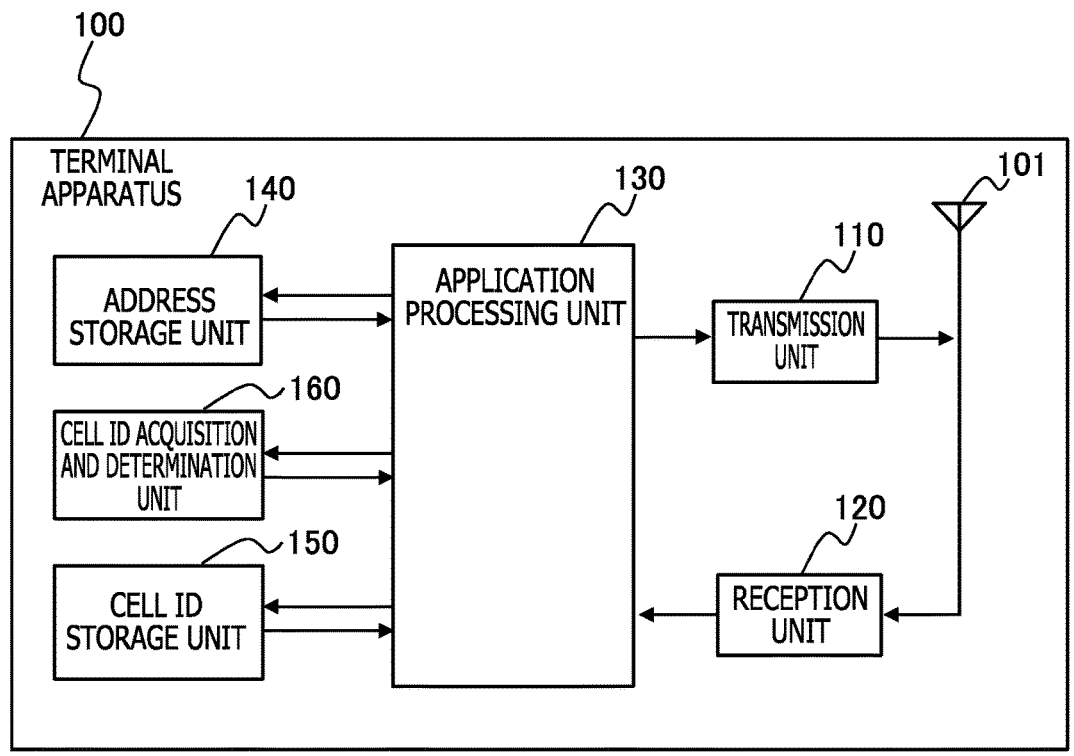
FIG. 14 is a diagram illustrating an example of a configuration of a terminal apparatus.

FIG. 14 is a diagram illustrating an example of a configuration of the terminal 100 in the third embodiment. The terminal 100 further includes a cell ID acquisition and determination unit 160.

The cell ID acquisition and determination unit 160 performs processing for determining, for example, whether or not a newly acquired cell ID (for example, the cell ID of the new base station 200-2) and a previously acquired cell ID (for example, the cell ID of the previous base station 200-1) are different from each other. In addition, the cell ID acquisition and determination unit 160 notifies the application processing unit 130 of a determination result.

In a case of obtaining a determination result indicating that the newly acquired cell ID and the previously acquired cell ID are different from each other, the application processing unit 130 generates a server switching request. In this case, based on it that the cell ID of the corresponding base station 200 is different, the application processing unit 130 recognizes that the corresponding base station 200 to which the terminal 100 is coupled is changed by handover. In addition, under the assumption that the corresponding base station 200 to which the terminal 100 is coupled is changed by handover, thereby changing the corresponding cache server 300, the application processing unit 130 generates and transmits the server switching request to the corresponding base station 200. By transmitting the server switching request, the terminal 100 is able to acquire the address of the corresponding cache server 300 after the change (for example, the new cache server 300-2). In this case, the application processing unit 130 transmits the server switching request while causing a changed cell ID (for example, the cell ID of the new base station 200-2) to be included in the server switching request.

On the other hand, in a case of obtaining a determination result indicating that the newly acquired cell ID and the previously acquired cell ID are identical to each other, the application processing unit 130 does not transmit a request to change the corresponding cache server 300 and performs no particular processing. In this case, since there is no change in the cell ID, for example, the application processing unit 130 recognizes that the terminal 100 does not change the coupled base station 200 (or the terminal 100 perform no HO).

Figure 15:
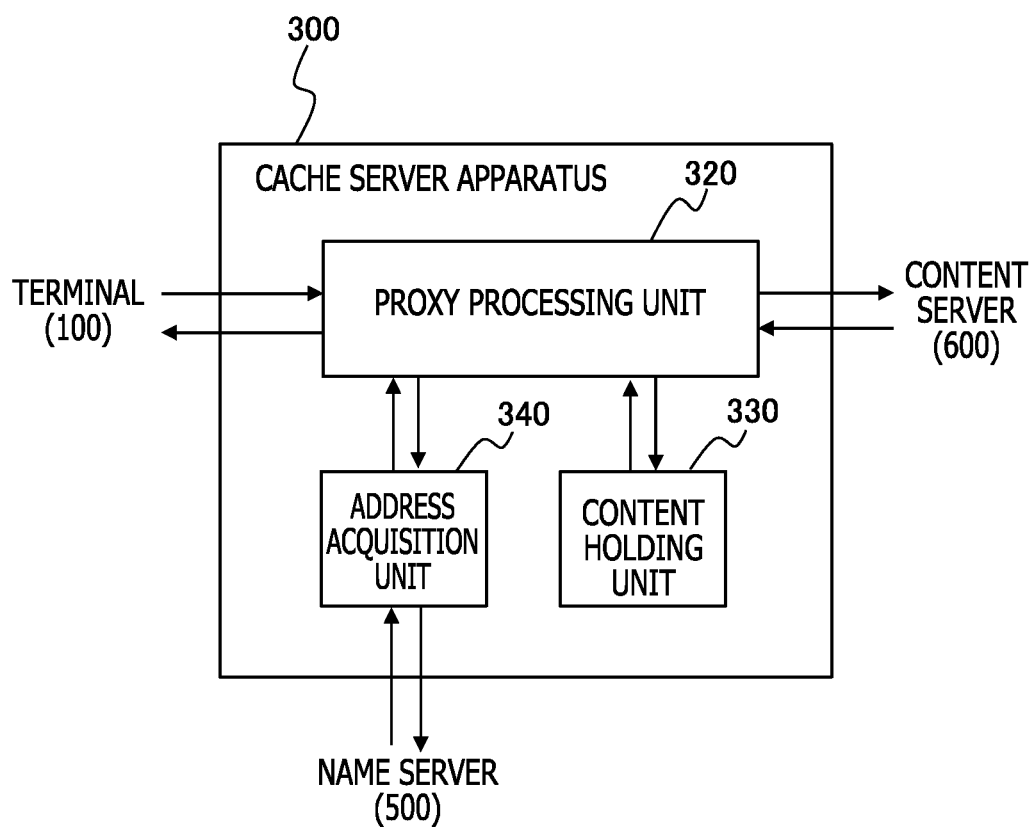
FIG. 15 is a diagram illustrating an example of a configuration of a cache server apparatus.

FIG. 15 is a diagram illustrating one of examples of configurations of the cache servers 300 in the third embodiment.

Upon receiving a server switching request from the terminal 100 via the corresponding base station 200 and so forth, the proxy processing unit 320 determines to change the address of the corresponding cache server 300. In addition, the proxy processing unit 320 extracts a cell ID included in the server switching request and instructs the address acquisition unit 340 to acquire the address of the cache server 300 corresponding to the relevant cell ID. The proxy processing unit 320 transmits, to the terminal 100, the address of the relevant cache server 300, received from the address acquisition unit 340.

In the same way as in the second embodiment, the corresponding cache server 300 may acquire the address of the relevant cache server 300 by sending an inquiry to the name server 500 or the corresponding cache server 300 may hold the database 520 and acquire the address of the relevant cache server 300 from the database 520.

Figure 16:
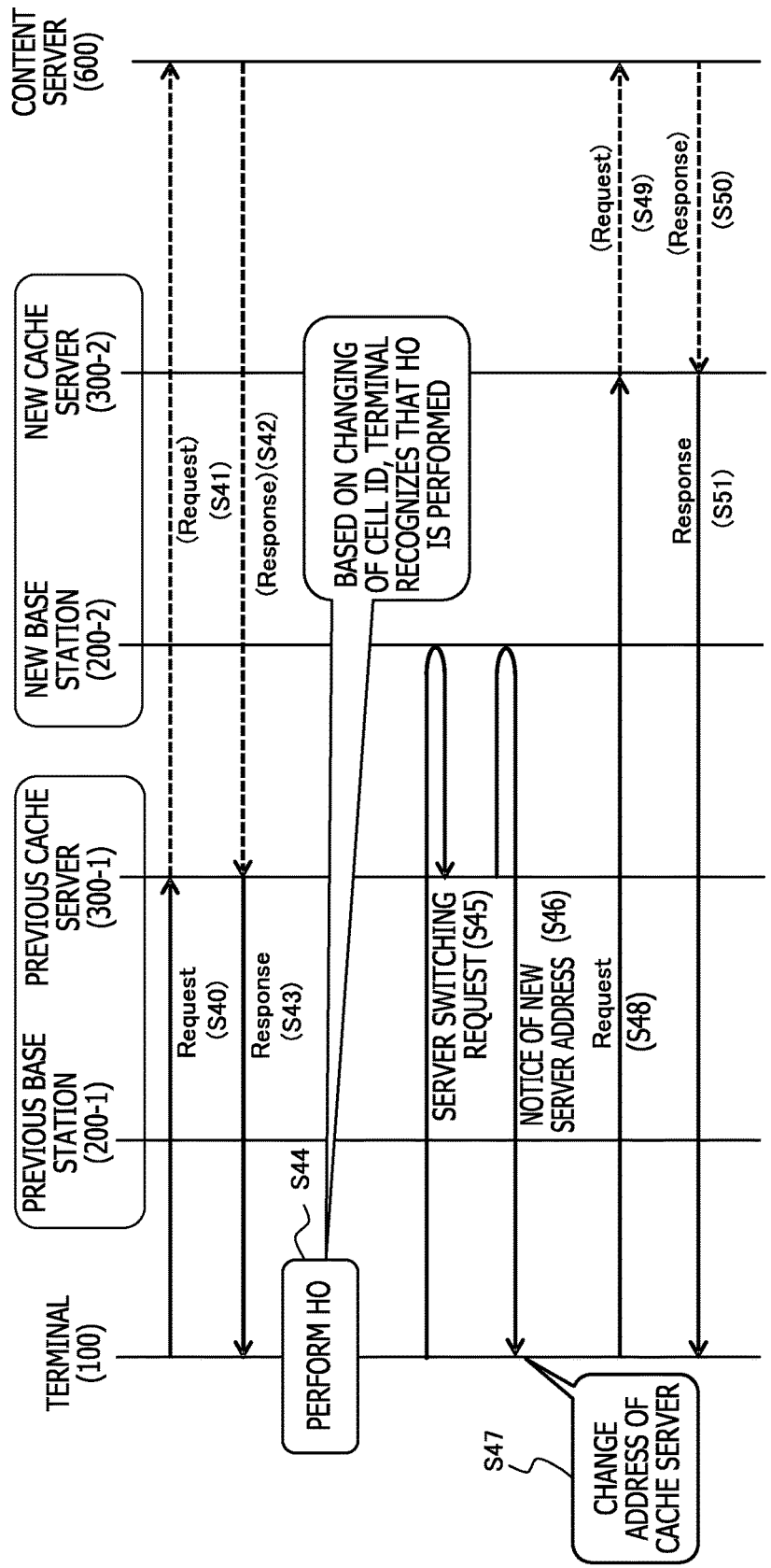
FIG. 16 is a sequence diagram illustrating an example of an operation.

FIG. 16 is a sequence diagram illustrating an example of an operation in the present third embodiment. In the present third embodiment, an example in a case where the terminal 100 performs HO from the previous base station 200-1 to the new base station 200-2 will be described.

In the same way as in the second embodiment, the terminal 100 transmits a content acquisition request to the previous cache server 300-1 (S40). In this case, unlike the second embodiment, the terminal 100 transmits the content acquisition request including no cell ID. Accordingly, in the present third embodiment, compared with the second embodiment, it is possible to reduce the transmission amount of the content acquisition request transmitted by the terminal 100, and it is possible to effectively utilize wireless resources.

Upon receiving the content acquisition request, the previous cache server 300-1 transmits a requested content to the terminal 100 (S43). In a case of not holding the requested content, the previous cache server 300-1 acquires the content from the content server 600 by transmitting a content acquisition request to the content server 600 and transmits the relevant content to the terminal 100 while holding the relevant content (S41 to S43).

The terminal 100 performs HO (S44).

The terminal 100 transmits a server switching request to the previous cache server 300-1 (S45).

For example, the following processing is performed. In other words, based on it that a cell ID acquired by HO processing is different from a previously acquired cell ID, the cell ID acquisition and determination unit 160 obtains a determination result indicating that the terminal 100 itself performs the HO. Based on such a determination result, the application processing unit 130 recognizes that the terminal 100 performs the HO and changes a coupled base station. In addition, in order to acquire the address of the cache server 300 coupled to the coupled base station 200 after the change, the application processing unit 130 generates and transmits a server switching request.

Upon receiving the server switching request, the previous cache server 300-1 transmits, to the terminal 100, the address of the new cache server 300-2 corresponding to the cell ID of the new base station 200-2 (S46).

In this case, in the same way as in, for example, the second embodiment, the previous cache server 300-1 may acquire the address of the new cache server 300-2 by sending an inquiry to the name server 500, and the address of the new cache server 300-2 may be acquired from the database 520 held in the previous cache server 300-1. In this case, the previous cache server 300-1 determines to change, to the address of the new cache server 300-2, the transmission destination of a content acquisition request (S48) transmitted from the terminal 100. Accordingly, the application processing unit 130 in the previous cache server 300-1 functions as, for example, an address converter.

The terminal 100 changes the address of the corresponding cache server 300 from the previous cache server 300-1 to the new cache server 300-2 (S47). In this case, the application processing unit 130 stores the address of the new cache server 300-2 in, for example, the address storage unit 140, thereby performing the preset processing. Since changing, for example, the address of the corresponding cache server 300, the application processing unit 130 functions as an address converter.

The terminal 100 transmits the content acquisition request to the new cache server 300-2 (S48). In this case, the terminal 100 changes the address of the transmission destination of the content acquisition request from the address of the previous cache server 300-1 to the address of the new cache server 300-2. From this, the terminal 100 is able to transmit the content acquisition request to the new cache server 300-2.

Upon receiving the content acquisition request, the new cache server 300-2 transmits, to the terminal 100, a content requested by the content acquisition request (S51). In a case of not holding the requested content, the new cache server 300-2 transmits a content acquisition request to the content server 600. The new cache server 300-2 receives a content transmitted from the content server 600 and transmits the received content to the terminal 100 while holding the received content (S49 to S51).

Note that FIG. 13 is used in the present third embodiment. In the present third embodiment, FIG. 13 is a flowchart illustrating an example of an operation in, for example, the terminal 100. Upon starting the processing (S30), the terminal 100 confirms a cell ID (S31) and judges whether or not the cell ID is changed (S32).

In a case where the cell ID is changed (S32: YES), the terminal 100 transmits a server switching request and acquires the address of the new cache server 300-2. From this, the terminal 100 is able to transmit a content acquisition request in which the address of the transmission destination is changed from the previous cache server 300-1 to the new cache server 300-2 (S33). In addition, the terminal 100 terminates a series of processing operations (S34).

On the other hand, in a case where the cell ID is not changed (S32: NO), the terminal 100 terminates a series of processing operations without changing the address of the corresponding cache server 300 (S34).

In the present third embodiment, based on the HO of the terminal 100, the corresponding cache server 300 is switched from the previous cache server 300-1 to the new cache server 300-2. From this, a path for acquiring a content is switched, for example, from FIG. 10 to FIG. 12.

Accordingly, in the present third embodiment, even in a case where the terminal 100 performs the HO, a path length is decreased and a transmission delay is reduced, compared with a case where switching of the corresponding cache server 300 is not performed (for example, FIG. 11). The reduction of the transmission delay enables the terminal 100 to use a content in real time.

In addition, in the present third embodiment, upon detecting the change of a cell ID, the terminal 100 transmits a server switching request (for example, S45 in FIG. 16), and immediately after the HO, the previous cache server 300-1 becomes able to switch the corresponding cache server 300. Accordingly, without waiting for a content acquisition request from the terminal 100 in such a manner as in the second embodiment (for example, S15 in FIG. 9), the previous cache server 300-1 is able to perform switching to the corresponding cache server 300 at a timing earlier than in the second embodiment. In addition, the previous cache server 300-1 is able to notify the terminal 100 of the address of the corresponding cache server 300 after the switching at a timing earlier than in a case of the second embodiment.

Fourth Embodiment

A fourth embodiment will be described. The fourth embodiment is an example in which the cache server 300 that is to transmit a content is specified in, for example, the name server 500.

Figure 17:
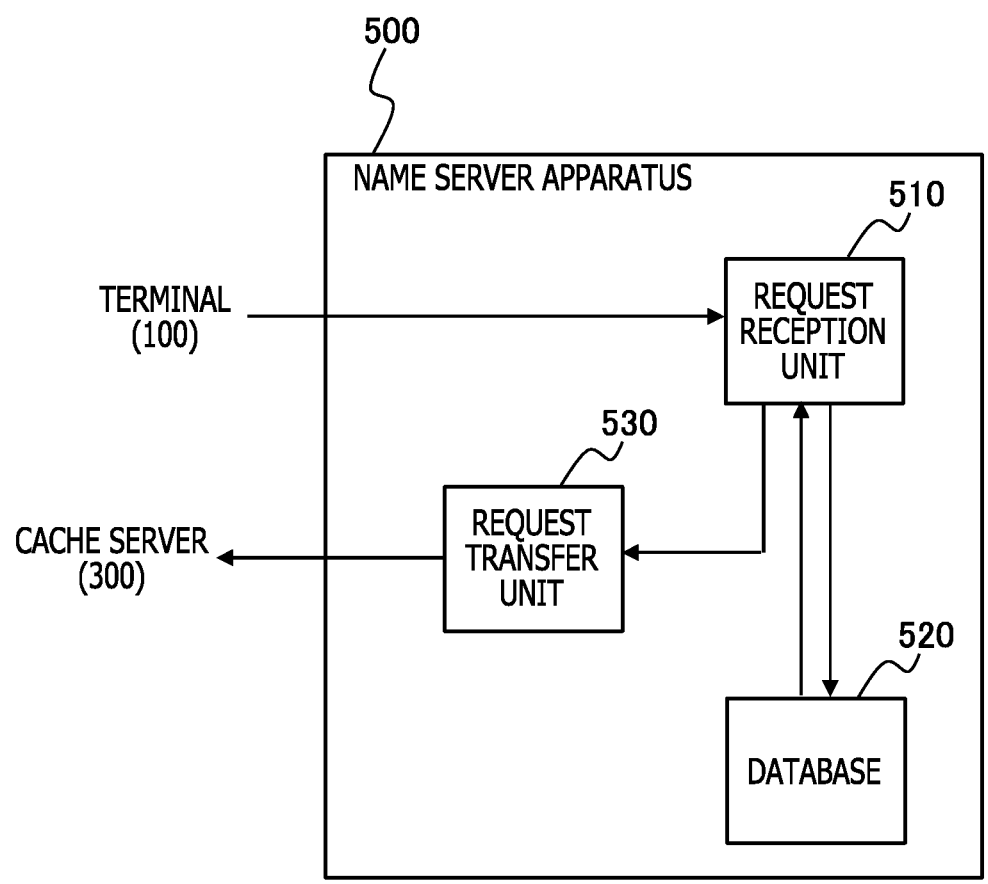
FIG. 17 is a diagram illustrating an example of a configuration of a name server apparatus.

FIG. 17 is a diagram illustrating an example of a configuration of the name server 500 in the present fourth embodiment. The name server 500 further includes a request transfer unit 530.

The request transfer unit 530 receives, from the request reception unit 510, a content acquisition request and the address of the corresponding cache server 300 to which the relevant content acquisition request is to be transmitted and which serves as a transmission destination. In addition, the request transfer unit 530 transmits the content acquisition request to the address of the relevant cache server 300.

In this case, while receiving a content acquisition request transmitted from the terminal 100, the request reception unit 510 changes the address of the transmission destination of the received content acquisition request.

In a case where a cell ID included in the content acquisition request is, for example, the previous base station 200-1, the request reception unit 510 changes to the address of the previous cache server 300-1. This case corresponds to, for example, a case where the terminal 100 is coupled to the previous base station 200-1 before performing HO.

In addition, in a case where a cell ID included in the content acquisition request is, for example, the new base station 200-2, the request reception unit 510 changes to the address of the new cache server 300-2. This case corresponds to, for example, a case where the terminal 100 changes a coupling destination to the new base station 200-2 by performing HO.

From this, it may be said that, in the name server 500, based on the HO of the terminal 100, the address of the transmission destination of the content acquisition request is changed from the address of the previous cache server 200-1 to the address of the new cache server 200-2. Since changing, for example, the address of the transmission destination of the content acquisition request, the request reception unit 510 functions as an address converter.

Figure 18:
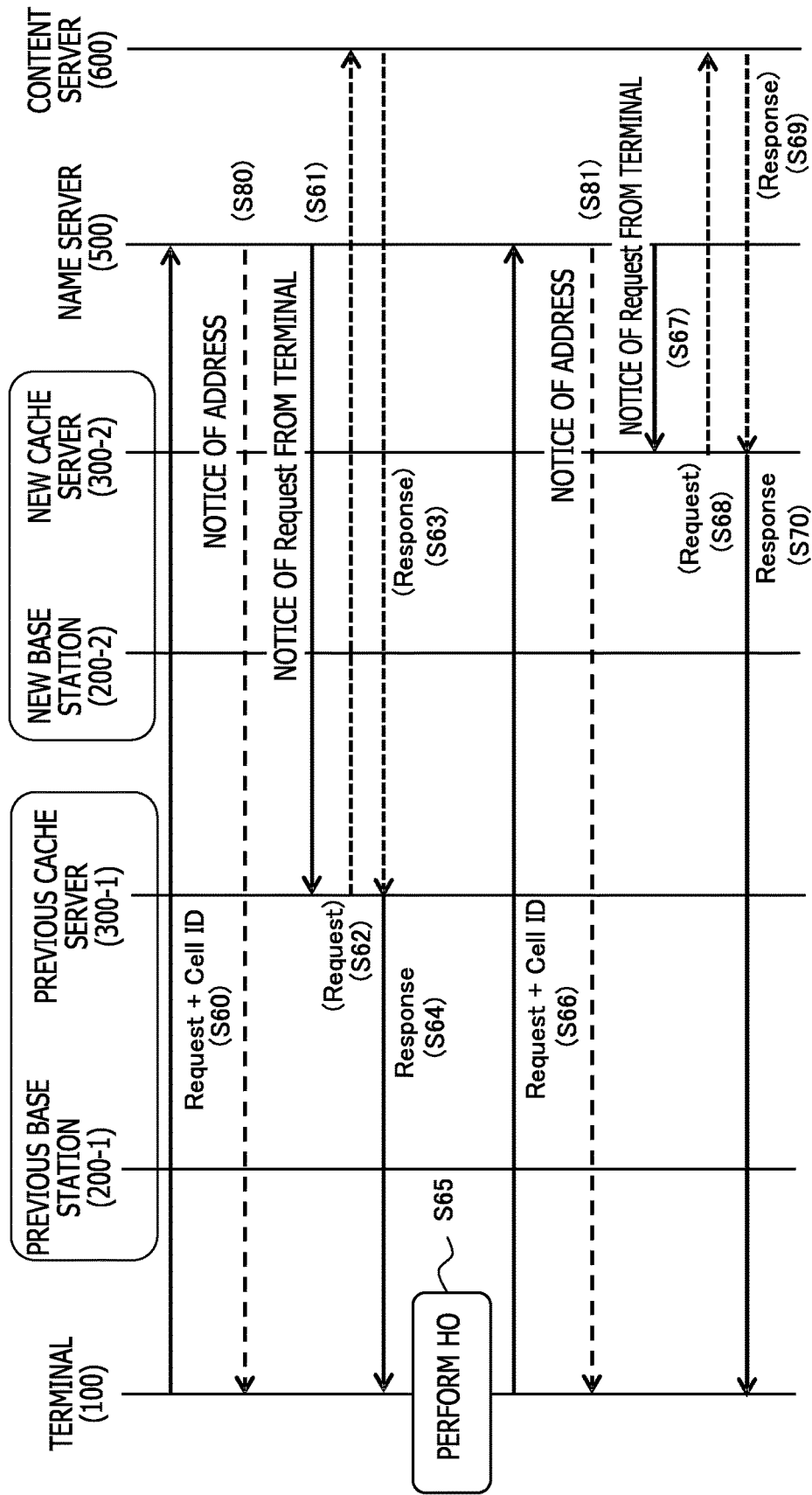
FIG. 18 is a sequence diagram illustrating an example of an operation.
Figure 19A:
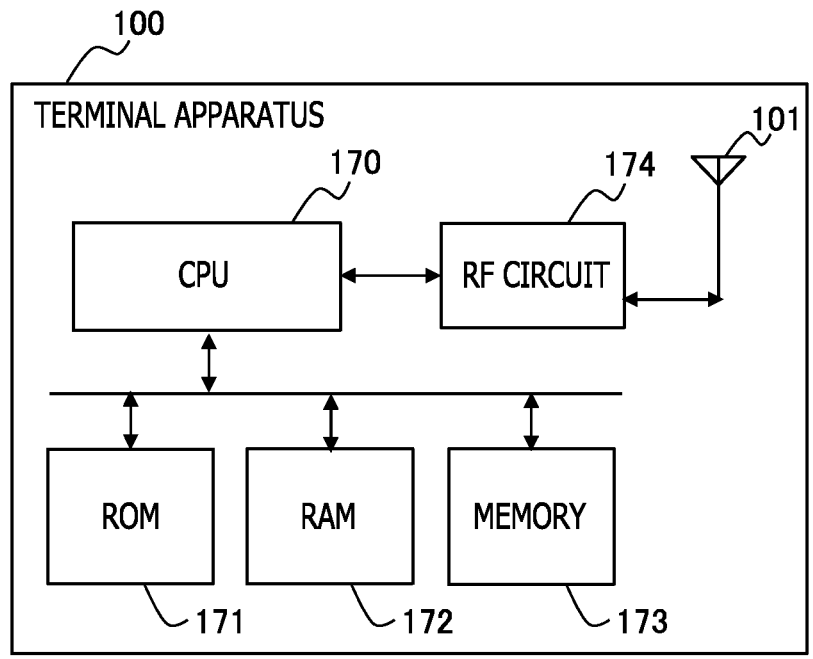
FIG. 19A is a diagram illustrating an example of a hardware configuration of the terminal apparatus.
Figure 19B:
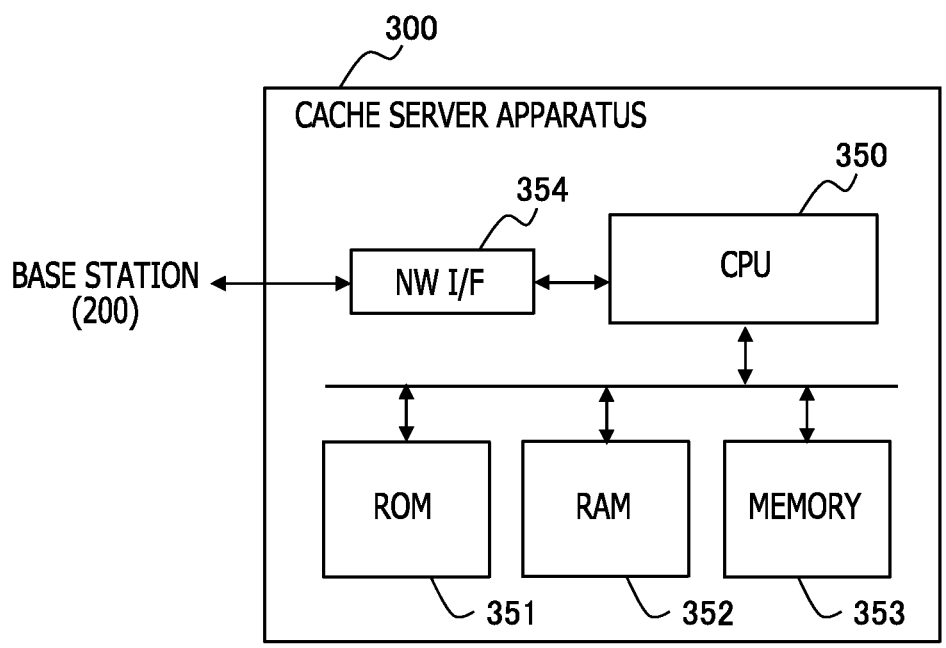
FIG. 19B is a diagram illustrating an example of a hardware configuration of the cache server apparatus.
Figure 20A:
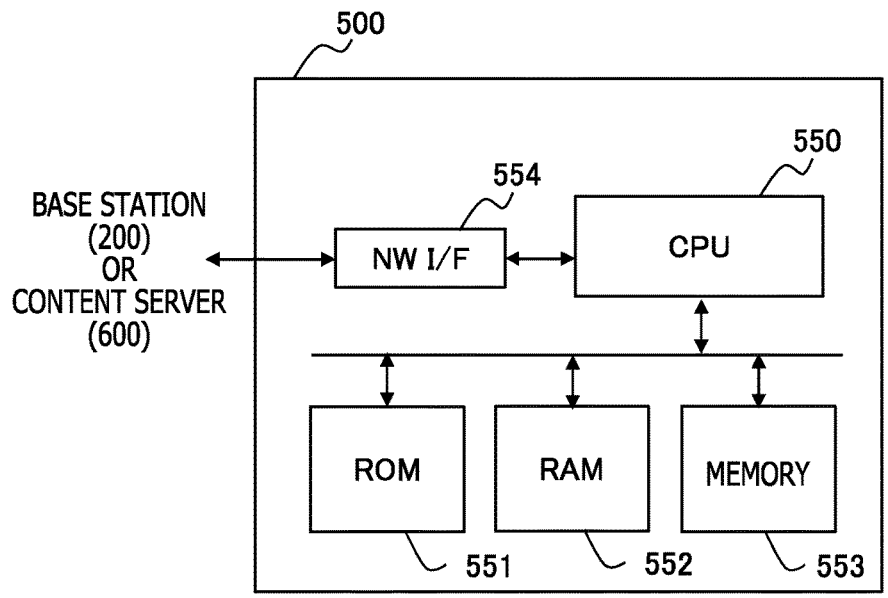
FIG. 20A is a diagram illustrating an example of a hardware configuration of the name server apparatus.
Figure 20B:
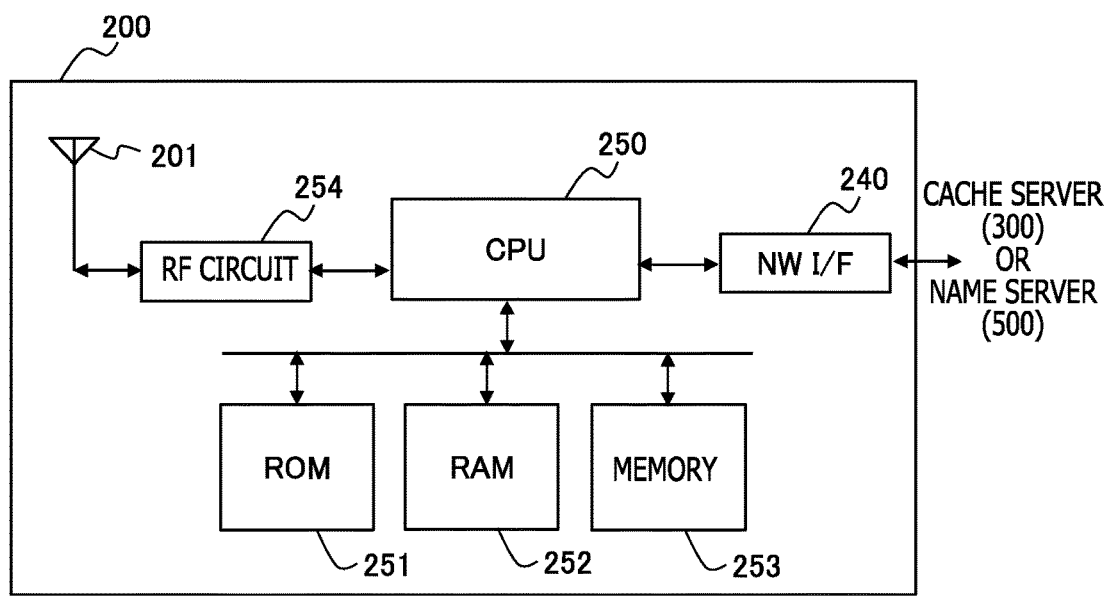
FIG. 20B is a diagram illustrating an example of a hardware configuration of the base station apparatus.

FIG. 18 is a sequence diagram illustrating an example of an operation in the present fourth embodiment. In an example illustrated in FIG. 18, an example of a case where the terminal 100 performs HO from the previous base station 200-1 to the new base station 200-2.

The terminal 100 transmits a content acquisition request to the name server 500 (S60). In this case, the terminal 100 transmits the content acquisition request including the cell ID (for example, the cell ID#1) of the previous base station 200-1.

Note that while, at the time of performing processing for being coupled to the previous base station 200-1 (or a network side including the previous base station 200-1), the terminal 100 is assigned with an IP address by the P-GW 500, the terminal 100 is able to acquire the address of the name server 500 at this time. The terminal 100 transmits the content acquisition request to the address of the name server 500.

Upon receiving the content acquisition request, the name server 500 transmits, to the previous cache server 300-1 corresponding to the cell ID of the previous base station 200-1, included in the content acquisition request, a content acquisition request (S61). In the database 520, a correspondence relationship between, for example, the cell ID of the previous base station 200-1 and the address of the previous cache server 300-1 (for example, FIG. 6) is held. Therefore, using this, the name server 500 transmits the content acquisition request to the previous cache server 300.

Upon receiving the content acquisition request from the name server 500, the previous cache server 300-1 transmits a requested content to the terminal 100 (S64). In this case, in a case of not holding the requested content, the previous cache server 300-1 acquires the relevant content from the content server 600 by transmitting the relevant content acquisition request to the content server 600. The previous cache server 300-1 transmits the acquired content to the terminal 100 while holding the relevant content (S62 and S63).

The terminal 100 performs HO (S65).

The terminal 100 transmits a content acquisition request to the name server 500 (S66). The content acquisition request includes the cell ID of the new base station 200-2.

Upon receiving the content acquisition request, the name server 500 acquires the address of the new cache server 300-2 corresponding to the cell ID of the new base station 200-2 and transmits a content acquisition request to the relevant address (S67).

Upon receiving the content acquisition request from the name server 500, the new cache server 300-2 transmits a requested content to the terminal 100 (S70). In this case, in a case of not holding the requested content, the new cache server 300-2 transmits a content acquisition request to the content server 600 and transmits the acquired content to the terminal 100 while holding the relevant content (S68 to S70).

Note that the name server 500 may notify the terminal 100 of the addresses of the cache servers 300-1 and 300-2 (S80 and S81).

In other words, upon receiving the content acquisition request including the cell ID of the previous base station 200-1 before the HO (S60), the name server 500 transmits the address of the previous cache server 300-1 to the terminal 100 (S80). In this case, the name server 500 may transmit the content acquisition request to the previous cache server 300-1 (S61). The terminal 100 receives the content from the previous cache server 300-1, and in a case of subsequently transmitting a content acquisition request before the HO, the terminal 100 transmits the content acquisition request to the previous cache server 300-1 by using the address of the previous cache server 300-1, received from the name server 500. From this, the terminal 100 is able to acquire the requested content from the previous cache server 300-1.

In addition, upon receiving the content acquisition request including the cell ID of the new base station 200-2 after the HO (S66), the name server 500 transmits the address of the new cache server 300-2 to the terminal 100 (S81). In this case, the name server 500 may transmit a content acquisition request to the new cache server 300-2 (S67). The terminal 100 receives the content from the new cache server 300-2, and in a case of subsequently transmitting a content acquisition request after the HO, the terminal 100 transmits the content acquisition request to the new cache server 300-2 by using the address of the new cache server 300-2, received from the name server 500. From this, the terminal 100 is able to acquire the requested content from the new cache server 300-2.

Note that FIG. 13 is used in the present fourth embodiment. In the present fourth embodiment, FIG. 13 is a flowchart illustrating an example of an operation in, for example, the name server 500.

Upon starting the processing (S30), the name server 500 confirms a cell ID (S31) and judges whether or not the cell ID is changed (S32). The name server 500 compares, for example, two cell IDs, received before and after HO, with each other (S60 and S66 in FIG. 18) and judges whether or not the corresponding cell ID is changed.

In a case where the corresponding cell ID is changed (S32: YES), the name server 500 sets the transmission destination address of the content acquisition request (S66 in FIG. 18) to the address of the cache server 300 corresponding to the received cell ID. In this case, after the HO, the name server 500 changes the address of the transmission destination of the content acquisition request to the address of the new cache server 300-2 (S33). In addition, the name server 500 terminates a series of processing operations (S34).

On the other hand, in a case where the cell ID is not changed (S32: NO), the name server 500 terminates a series of processing operations without changing the address of the corresponding cache server 300 (S34).

In the present fourth embodiment, a content is transmitted from the previous cache server 300-1 before HO, and a content is transmitted from the new cache server 300-2 after the HO (for example, S64 and S70 in FIG. 18). Accordingly, in the present fourth embodiment, based on the HO of the terminal 100, the corresponding cache server 300 is switched. Therefore, compared with a case of not performing the switching (for example, FIG. 11), the path length of a path for acquiring the content is decreased (for example, FIG. 12).

Accordingly, in the present fourth embodiment, a transmission delay is reduced compared with a case where switching of the corresponding cache server 300 is not performed, and it is possible for the terminal 100 to use a content in real time.

In addition, in the present fourth embodiment, the terminal 100 only has to hold the address of the name server 500 and does not have to hold the addresses of the cache servers 300. Therefore, the terminal 100 in the present fourth embodiment is able to reduce the capacity of, for example, a memory, compared with the terminal in each of the above-mentioned embodiments.

Other Embodiments

Other embodiments will be described. FIG. 19A, FIG. 19B, FIG. 20A, and FIG. 20B illustrate examples of hardware configurations of the terminal 100, the cache server 300, the name server 500, and the base station 200, respectively.

The terminal 100 includes a central processing unit (CPU) 170, a read only memory (ROM) 171, a random access memory (RAM) 172, a memory 173, a radio frequency (RF) circuit 174, and an antenna 101.

The CPU 170 reads and loads a program, stored in the ROM 171, into the RAM 172 and executes the loaded program, thereby realizing the function of the application processing unit 130. The CPU 170 corresponds to, for example, the application processing unit 130. In addition, the memory 173 corresponds to, for example, the address storage unit 140 and the cell ID storage unit 150.

The RF circuit 174 performs processing operations such as converting a wireless signal to a baseband signal and converting a baseband signal to a wireless signal. The RF circuit 174 corresponds to, for example, the transmission unit 110 and the reception unit 120.

The cache server 300 includes a CPU 350, a ROM 351, a RAM 352, a memory 353, and a NW I/F 354.

The CPU 350 reads and loads a program, stored in the ROM 351, into the RAM 352 and executes the loaded program, thereby realizing the respective functions of the cell ID confirmation unit 310, the proxy processing unit 320, and the address acquisition unit 340. The CPU 350 corresponds to, for example, the cell ID confirmation unit 310, the proxy processing unit 320, and the address acquisition unit 340. In addition, the memory 353 corresponds to, for example, the content holding unit 330 and the database 520.

The NW I/F 354 converts data and so forth, received from the CPU 350, to packets of a format transmittable to the base station 200 and transmits the packets. In addition, the NW I/F 354 extracts data and so forth from packets received from the base station 200 and outputs the data and so forth to the CPU 350. The NW I/F 354 corresponds to, for example, the cell ID confirmation unit 310, the proxy processing unit 320, and the address acquisition unit 340.

The name server 500 includes a CPU 550, a ROM 551, a RAM 552, a memory 553, and a NW I/F 554.

The CPU 550 reads and loads a program, stored in the ROM 551, into the RAM 552 and executes the loaded program, thereby realizing the functions of the request reception unit 510 and the request transfer unit 530. The CPU 550 corresponds to, for example, the request reception unit 510 and the request transfer unit 530. In addition, as, for example, a P-GW, the CPU 550 performs issuing of an IP address and so forth on the terminal 100.

In addition, the memory 553 stores therein the database 520. The memory 553 corresponds to, for example, the database 520.

Furthermore, the NW I/F 554 converts data and so forth, received from the CPU 550, to pieces of packet data transmittable to the S-GW 400 and the content server 600 and transmits the converted pieces of packet data to the S-GW 400 and the content server 600. The NW I/F 554 corresponds to, for example, the request reception unit 510 and the request transfer unit 530.

The base station 200 includes an antenna 201, a NW I/F 240, a CPU 250, a ROM 251, a RAM 252, a memory 253, and an RF circuit 254.

The CPU 250 reads and loads a program, stored in the ROM 251, into the RAM 252 and executes the loaded program, thereby realizing the function of the processing unit 230. The CPU 250 corresponds to, for example, the processing unit 230. In addition, the RF circuit 254 corresponds to, for example, the transmission unit 210.

Note that, in place of the CPUs 170, 350, 550, and 250 in the above-mentioned terminal 100, cache server 300, name server 500, and base station 200, respectively, controllers such as micro processing units (MPUs), field programmable gate arrays (FPGAs), or the like may be used.

In addition, in the above-mentioned embodiments, an example in which the cache servers 300-1 and 300-2 are coupled to the base stations 200-1 and 200-1, respectively, is described. For example, the cache servers 300-1 and 300-2 may be included in the base stations 200-1 and 200-2, respectively. In this case, the whole or part of the region of the memory 253 in the base station 200 corresponds to the content holding unit 330 in the cache server 300 and holds contents from the content server 600. Furthermore, the processing unit 230 in the base station 200 corresponds to, for example, the cell ID confirmation unit 310, the proxy processing unit 320, the address acquisition unit 340, and so forth and realizes the functions of these.

In addition, in the above-mentioned embodiments, an example of a case where the terminal 100 performs wireless communication with the base stations 100-1 and 100-2 is described. Even in a case where the terminal 100 switches coupling by using, for example, wired coupling, it is possible to implement the above-mentioned embodiments. In this case, in place of the base stations 100-1 and 100-2, first and second gateway apparatuses that manage, for example, local area networks (LANs) are set. The previous cache server 300-1 is coupled to the first gateway apparatus, and the new cache server 300-2 is coupled to the second gateway apparatus. Even in a case where the coupling destination of the terminal 100 is switched from the first gateway apparatus to the second gateway apparatus, the terminal 100 and the previous cache server 300-1 change the address of the corresponding cache server to the new cache server 300-2 in the same way as in any one of the above-mentioned embodiments. Even in this case, a path for acquiring a content becomes equal to that in any one of the above-mentioned embodiments. In addition, even in a case where coupling is switched using wired coupling, it is possible to reduce a transmission delay caused by the movement of the terminal 100, and it is possible for the terminal 100 to use the content in real time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a memory; and
a processor coupled to the memory and configured to:
transmit a first content acquisition request for a content to a first server apparatus via a first base station apparatus, the first server apparatus being coupled to the first base station apparatus,
receive the content, requested by the first content acquisition request, from the first server apparatus via the first base station apparatus, and
execute a handover process from the first base station apparatus to a second base station apparatus,
transmit, to the first server apparatus via the second base station apparatus, first information indicating the second base station apparatus and a second content acquisition request for the content,
receive, from the first server apparatus via the second base station apparatus, the content and second information indicating a second address of a second sever apparatus coupled to the second base station apparatus,
change a transmission destination address in a third content acquisition request to be transmitted to the second base station apparatus, from a first address of the first server apparatus to the second address of the second server apparatus.

2. The communication apparatus according to claim 1, wherein
contents acquired from a content server are stored in the first server apparatus and the second server apparatus, and contents are transmitted from the first server apparatus and the second server apparatus to the communication apparatus in response to the second content acquisition request and the third content acquisition request, respectively.

3. The communication apparatus according to claim 1, wherein the processor is configured to
transmit, to the second server apparatus via the second base station apparatus, the third content acquisition request in which the transmission destination address is changed to the second address of the second server apparatus, and
receive a content, requested by the third content acquisition request, from the second server apparatus via the second base station apparatus.

4. The communication apparatus according to claim 1, wherein the processor is configured to
transmit, to the first base station apparatus, the first content acquisition request including first identification information of the first base station apparatus.

5. The communication apparatus according to claim 1, wherein the processor is configured to
transmit, to the first server apparatus via the second base station apparatus, a server switching request for requesting the second address of the second server apparatus.

6. The communication apparatus according to claim 5, wherein the processor is configured to
receive the second address of the second server apparatus from the first server apparatus via the second base station apparatus in response to the server switching request.

7. The communication apparatus according to claim 1, wherein the processor is configured to
transmit, to a third server apparatus via the first base station apparatus, a fourth content acquisition request including first identification information of the first base station apparatus,
receive, from the first server apparatus via the first base station apparatus, a content requested by the fourth content acquisition request,
transmit, to the third server apparatus via the second base station apparatus, a fifth content acquisition request including second identification information of the second base station apparatus, and
receive, from the second server apparatus via the second base station apparatus, a content requested by the fifth content acquisition request.

8. The communication apparatus according to claim 7, wherein the processor is configured to
transmit the fourth content acquisition request to the third server apparatus via the first base station apparatus,
receive the first address of the first server apparatus from the third server apparatus via the first base station apparatus,
transmit the fifth content acquisition request to the third server apparatus via the second base station apparatus, and
receive the second address of the second server apparatus from the third server apparatus via the second base station apparatus.

9. A storage apparatus comprising:
a memory; and
a processor coupled to the memory and configured to
receive a first content acquisition request for a content from a terminal apparatus via a first base station apparatus, the storage apparatus being coupled to the first base station apparatus,
transmit the content, requested by the first content acquisition request, to the terminal apparatus via the first base station apparatus,
after the terminal apparatus executes a handover process from the first base station apparatus to a second base station apparatus, receive, from the terminal apparatus the second base station apparatus, first information indicating the second base station apparatus and a second content acquisition request for the content, and
transmit, to the terminal apparatus via the second base station apparatus, the content and second information indicating a second address of a second storage apparatus coupled to the second base station apparatus,
wherein the terminal apparatus changes a transmission destination address in a third content acquisition request to be transmitted from the terminal apparatus to the second base station apparatus, from a first address of the storage apparatus to the second address of the second storage apparatus.

10. The storage apparatus according to claim 9, wherein contents acquired from a content server are stored in the storage apparatus and the second storage apparatus, and contents are transmitted from the storage apparatus and the second storage apparatus to the terminal apparatus in response to the second content acquisition request and the third content acquisition request, respectively.

11. The storage apparatus according to claim 9, wherein the processor is configured to
acquire, from a name server apparatus coupled to the storage apparatus, the second address of the second storage apparatus, and
transmit the second address of the second storage apparatus to the terminal apparatus.

12. The storage apparatus according to claim 9, wherein the memory is configured to
hold the second address of the second storage apparatus, and
the processor is configured to
acquire, from the memory, the second address of the second storage apparatus, and
transmit the second address of the second storage apparatus to the terminal apparatus.

13. A control method for a communication system including a terminal apparatus, a first base station apparatus and a second base station apparatus that each perform wireless communication with the terminal apparatus, and a first server apparatus and a second server apparatus that are coupled to the first base station apparatus and the second base station apparatus, respectively, the control method comprising:
receiving, using the first server apparatus, a first content acquisition request for a content from the terminal apparatus via the first base station apparatus;
transmitting the content, requested by the first content acquisition request, to the terminal apparatus via the first base station apparatus;
executing a handover process from the first base station apparatus to a second base station apparatus;
transmitting, to the first server apparatus via the second base station apparatus, first information indicating the second base station apparatus and a second content acquisition request for the content;
receiving, from the first server apparatus via the second base station apparatus, the content and second information indicating a second address of a second sever apparatus coupled to the second base station apparatus; and
changing a transmission destination address in a third content acquisition request to be transmitted to the second base station apparatus, from a first address of the first server apparatus to the second address of the second server apparatus.

14. The control method according to claim 13, wherein contents acquired from a content server are stored in the first server apparatus and the second server apparatus, and contents are transmitted from the first server apparatus and the second server apparatus to the terminal apparatus in response to the second content acquisition request and the third content acquisition request, respectively.

* * * * *